(12) United States Patent
Crane et al.

(10) Patent No.: US 7,472,955 B2
(45) Date of Patent: Jan. 6, 2009

(54) INFANT CAR SEAT

(75) Inventors: Charles E. Crane, Coatesville, PA (US); Matthew A. Morgenstern, West Chester, PA (US); Shiva M. Gangadharan, West Chester, PA (US); Damaso A. Lamos, Reading, PA (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 10/999,145

(22) Filed: Nov. 30, 2004

(65) Prior Publication Data

US 2005/0173955 A1   Aug. 11, 2005

Related U.S. Application Data

(60) Provisional application No. 60/561,530, filed on Apr. 13, 2004, provisional application No. 60/525,849, filed on Dec. 1, 2003.

(51) Int. Cl.
 *A47D 1/10* (2006.01)
(52) U.S. Cl. .............................. 297/256.16; 297/250.1; 297/256.1; 297/256.13
(58) Field of Classification Search .............. 297/250.1, 297/256.1, 256.13, 256.16
 See application file for complete search history.

(56) References Cited

U.S. PATENT DOCUMENTS

| | | | | |
|---|---|---|---|---|
| 4,186,961 A | * | 2/1980 | Farrell et al. | 297/256.1 |
| 4,343,510 A | * | 8/1982 | Cone | 297/256.13 |
| 4,345,791 A | * | 8/1982 | Bryans et al. | 297/256.16 X |
| 4,376,551 A | * | 3/1983 | Cone | 297/256.13 |
| 4,634,177 A | | 1/1987 | Meeker | |
| 4,911,499 A | * | 3/1990 | Meeker | 297/260.2 |
| 4,915,446 A | | 4/1990 | Darling et al. | |
| 4,943,113 A | * | 7/1990 | Meeker | 297/256.16 |

(Continued)

OTHER PUBLICATIONS

Dreamtime Baby Website—Baby Car Seats Inventory.*

(Continued)

*Primary Examiner*—Rodney B. White
(74) *Attorney, Agent, or Firm*—Lempia Braidwood LLC

(57) ABSTRACT

An infant car seat includes a base and a carrier to detachably secure to the base. In an exemplary infant car seat, the carrier can have a carrier weight of less than 10 pounds, and the infant car seat can have a rated weight of up to 40 pounds. In another exemplary infant car seat, the carrier can have a carrier weight of less than 10 pounds, a front surface of the seat back of the carrier can have a length greater than about 20 inches, and the infant car seat can have a rated weight of at least about 27.5 pounds. In another exemplary infant car seat, the carrier can have a carrier weight of less than 10 pounds, a front surface of the seat back of the carrier can have a length greater than about 20 inches, and the infant car seat can have a rated weight of greater than 22 pounds. In another exemplary infant car seat, the carrier can have a carrier weight of less than 10 pounds, and the infant car seat can have a rated height of up to 35 inches. In another exemplary infant car seat, the carrier can have a carrier weight of less than 10 pounds and can provide legroom of greater than 2 inches in an upright latching position.

36 Claims, 20 Drawing Sheets

U.S. PATENT DOCUMENTS

| | | | |
|---|---|---|---|
| 5,052,750 A * | 10/1991 | Takahashi et al. | 297/256.13 |
| 5,277,472 A * | 1/1994 | Freese et al. | 297/256.16 X |
| 5,335,964 A | 8/1994 | Sedlack et al. | |
| 5,385,387 A * | 1/1995 | Kain | 297/256.16 |
| 5,478,135 A * | 12/1995 | Kain | 297/256.16 |
| 5,551,751 A * | 9/1996 | Sedlack et al. | 297/256.13 |
| 5,567,008 A * | 10/1996 | Cone, II | 297/256.16 |
| 5,609,393 A * | 3/1997 | Meeker et al. | 297/256.13 |
| 5,746,478 A * | 5/1998 | Lumley et al. | 297/256.13 |
| 5,890,762 A * | 4/1999 | Yoshida | 297/256.13 |
| 5,915,787 A * | 6/1999 | Brookman | 297/256.13 |
| 5,997,086 A * | 12/1999 | Gibson et al. | 297/256.16 |
| 6,017,088 A | 1/2000 | Stephens et al. | |
| 6,059,360 A * | 5/2000 | Bedard | 297/250.1 |
| 6,070,890 A * | 6/2000 | Haut et al. | 297/256.16 X |
| 6,139,099 A | 10/2000 | Sköld et al. | |
| 6,139,101 A * | 10/2000 | Berringer et al. | 297/256.1 |
| 6,220,662 B1 * | 4/2001 | Franco-Vila et al. | 297/256.13 |
| 6,367,875 B1 * | 4/2002 | Bapst | 297/250.1 |
| 6,378,937 B1 * | 4/2002 | Faudman | 297/256.16 X |
| 6,412,865 B1 * | 7/2002 | Bedard | 297/250.1 |
| 6,447,060 B1 * | 9/2002 | Vila et al. | 297/256.13 |
| 6,454,350 B1 * | 9/2002 | Celestina-Krevh et al. | 297/256.16 X |
| 6,513,870 B1 * | 2/2003 | Takizawa | 297/216.11 |
| 6,554,358 B2 | 4/2003 | Kain | |
| 6,588,849 B2 * | 7/2003 | Glover et al. | 297/250.1 X |
| 6,616,226 B2 * | 9/2003 | Yanagihara | 297/250.1 |
| 6,626,489 B2 | 9/2003 | Geis et al. | |
| 6,692,072 B2 * | 2/2004 | Nelson et al. | 297/250.1 |
| 6,702,380 B2 * | 3/2004 | Bedard | 297/250.1 |
| 6,705,676 B1 * | 3/2004 | Berringer et al. | 297/256.16 |
| 6,715,828 B1 * | 4/2004 | Cheng | 297/256.16 X |
| 6,811,216 B2 * | 11/2004 | Sedlack | 297/250.1 |
| 6,834,915 B2 * | 12/2004 | Sedlack | 297/256.13 |
| 6,863,286 B2 * | 3/2005 | Eros et al. | 297/256.16 X |
| 6,908,151 B2 * | 6/2005 | Meeker et al. | 297/250.1 |
| 6,979,057 B2 * | 12/2005 | Sedlack | 297/250.1 X |
| 7,040,694 B2 * | 5/2006 | Sedlack | 297/256.16 X |
| 7,059,677 B2 * | 6/2006 | Balensiefer et al. | 297/256.13 |
| 2001/0004163 A1 | 6/2001 | Yamazaki | |
| 2002/0195849 A1 * | 12/2002 | Bedard | 297/250.1 |
| 2003/0062746 A1 | 4/2003 | Takizawa | |
| 2003/0164631 A1 | 9/2003 | Sedlack | |
| 2003/0164632 A1 | 9/2003 | Sedlack | |
| 2006/0082196 A1 * | 4/2006 | McConnell et al. | 297/250.1 X |

OTHER PUBLICATIONS

Dreamtime Baby Website—Infant Car Seat Inventory.*
Dreamtime baby—Baby Store Dreamtime Baby.*
BizRate Shopping Search—Peg Perego Primo Viaggio Infant Car Seat.*
Epinions.com—Combi Connection 8040—Claret Infant Car Seat.*
Child Car Seat—Graco Snugride Infatn Car Seat.*
Dreamtime Baby—Comapass I-400 Lightweight Infant Car Seat.*
Per Perego—Recall Safety Information.*
Federal Standard No. 213—Child Restraint Systems, 49 CFR 571. 213 Sections: 6.1.2(b); 5.5; 5.5.2F; 7; 7.1a; 7.1.b; and 7.1.c., *National Highway Traffic Safety Admin., DOT*, pp. 595, 602, 611-614.
Chart of infant car seat weight ranges (1 page); prepared by applicants.
Instruction booklet for Peg Perego Primo Viaggio, Oct. 2002, pp. 1-2 and 1-16.
Chicco KeyFit Infant Car Seat, www.healthchecksystems.com/chicco_keyfit_car_seat.htm, Jul. 19, 2005, pp. 1-4.
Instruction Manual for Tyro™ Infant Car Seat 8000 Series, Apr. 2005, pp. 1-36.
Baby Trend Owner's Manual, Safety Seat, Sep. 2003, pp. 1-39.
Instruction booklet for Evenflo Discovery 3, Oct. 2003, pp. 1-3 and 1-16.
Instruction booklet for Dorel Cosco Arriva, Oct. 2003, pp. 1-3 and 1-24.
Instruction booklet for Cosco Opus 35/Designer 35, pp. 1-2 and 1-14.

* cited by examiner

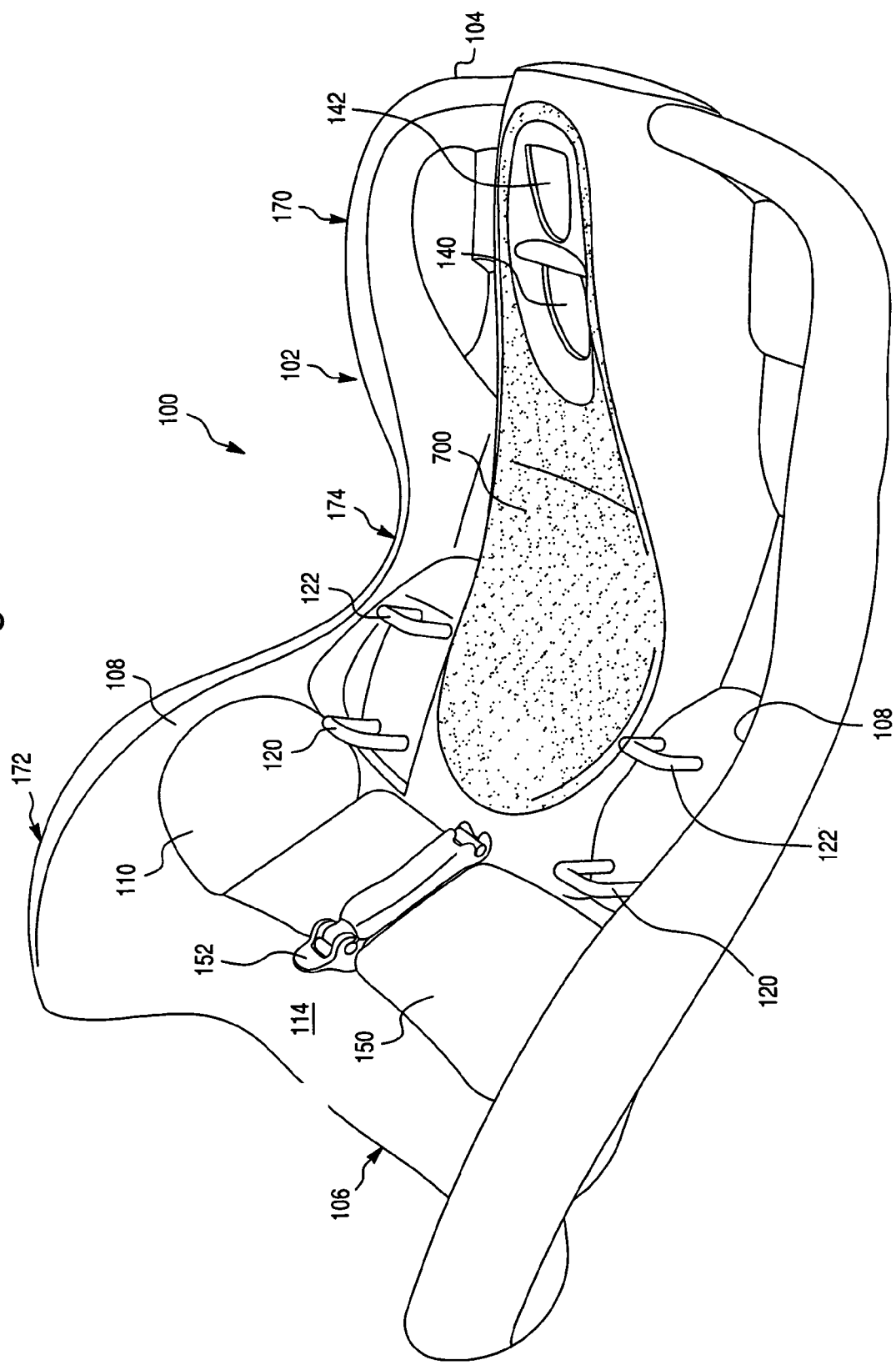

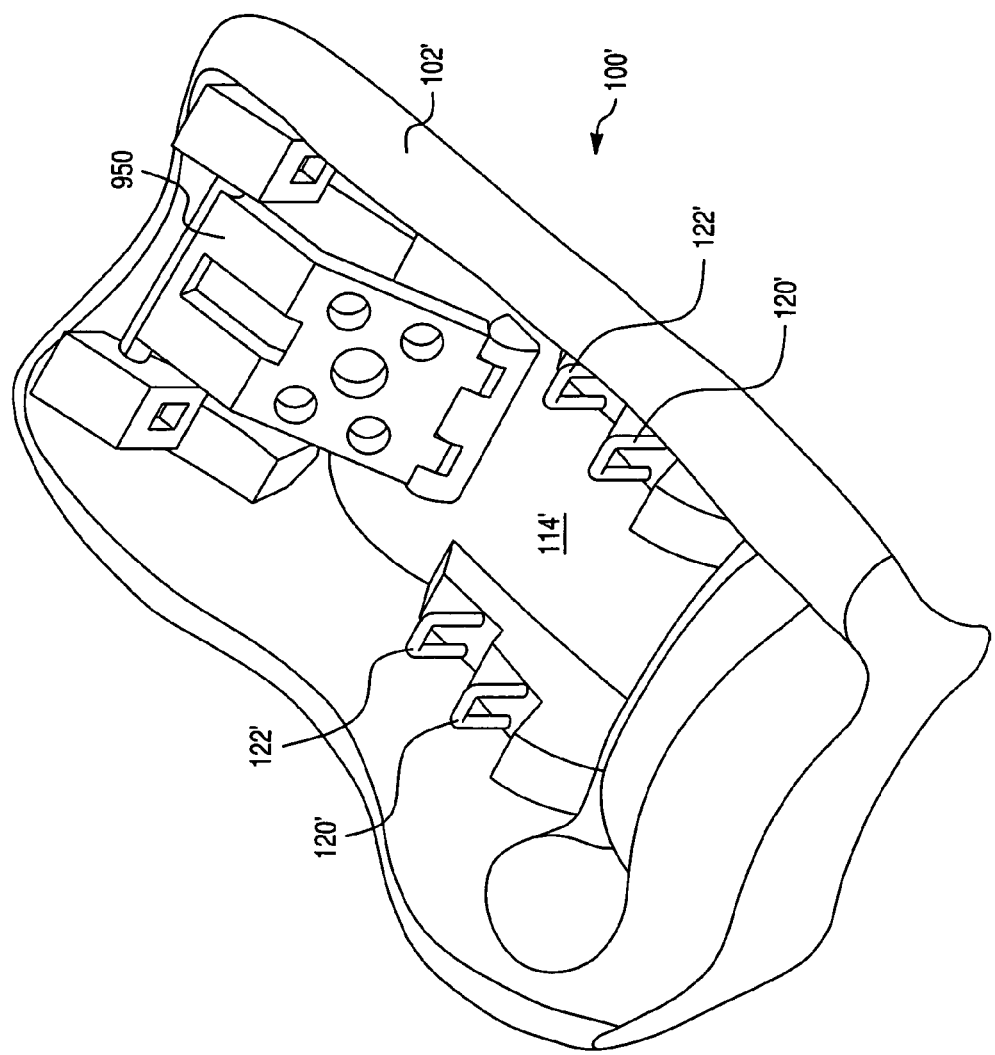

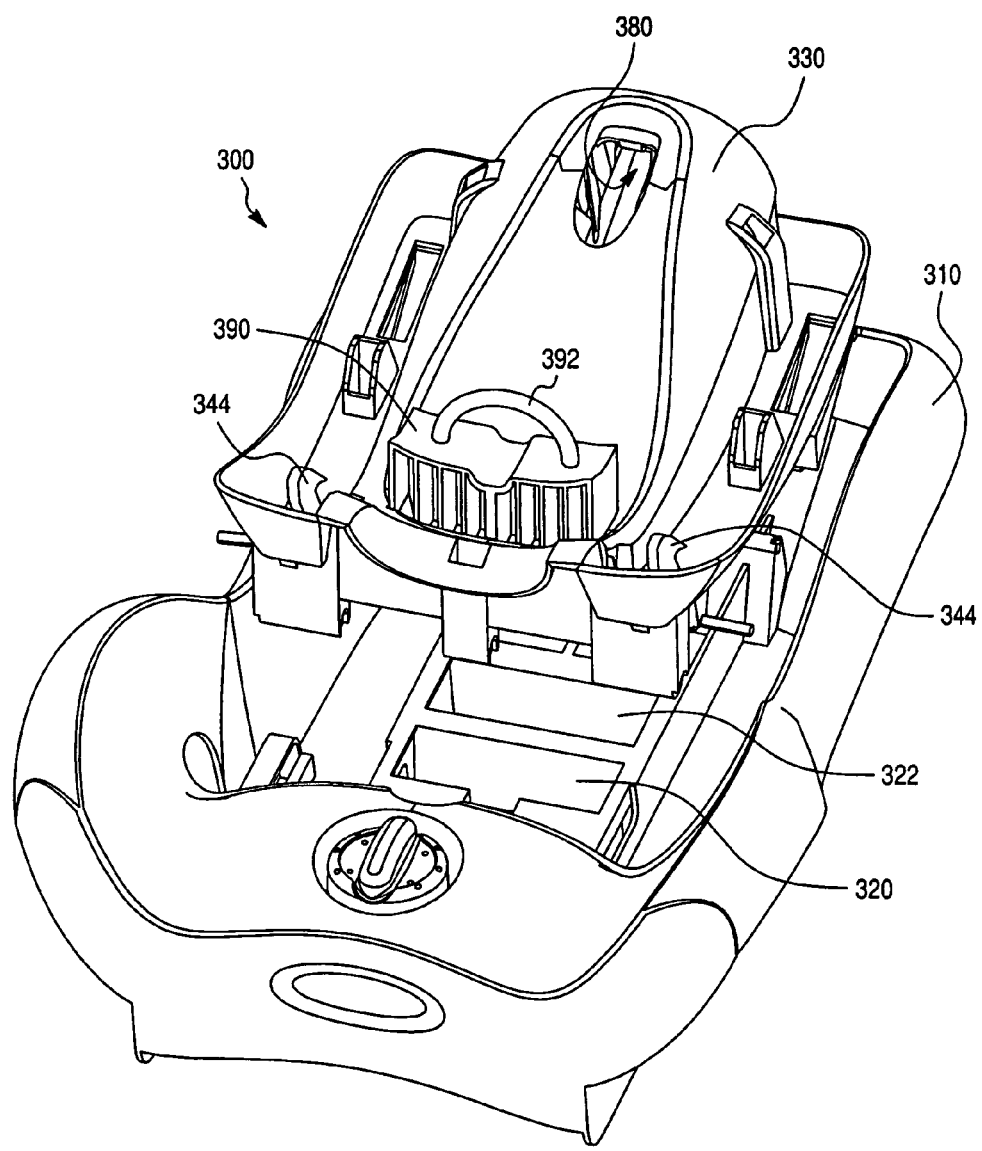

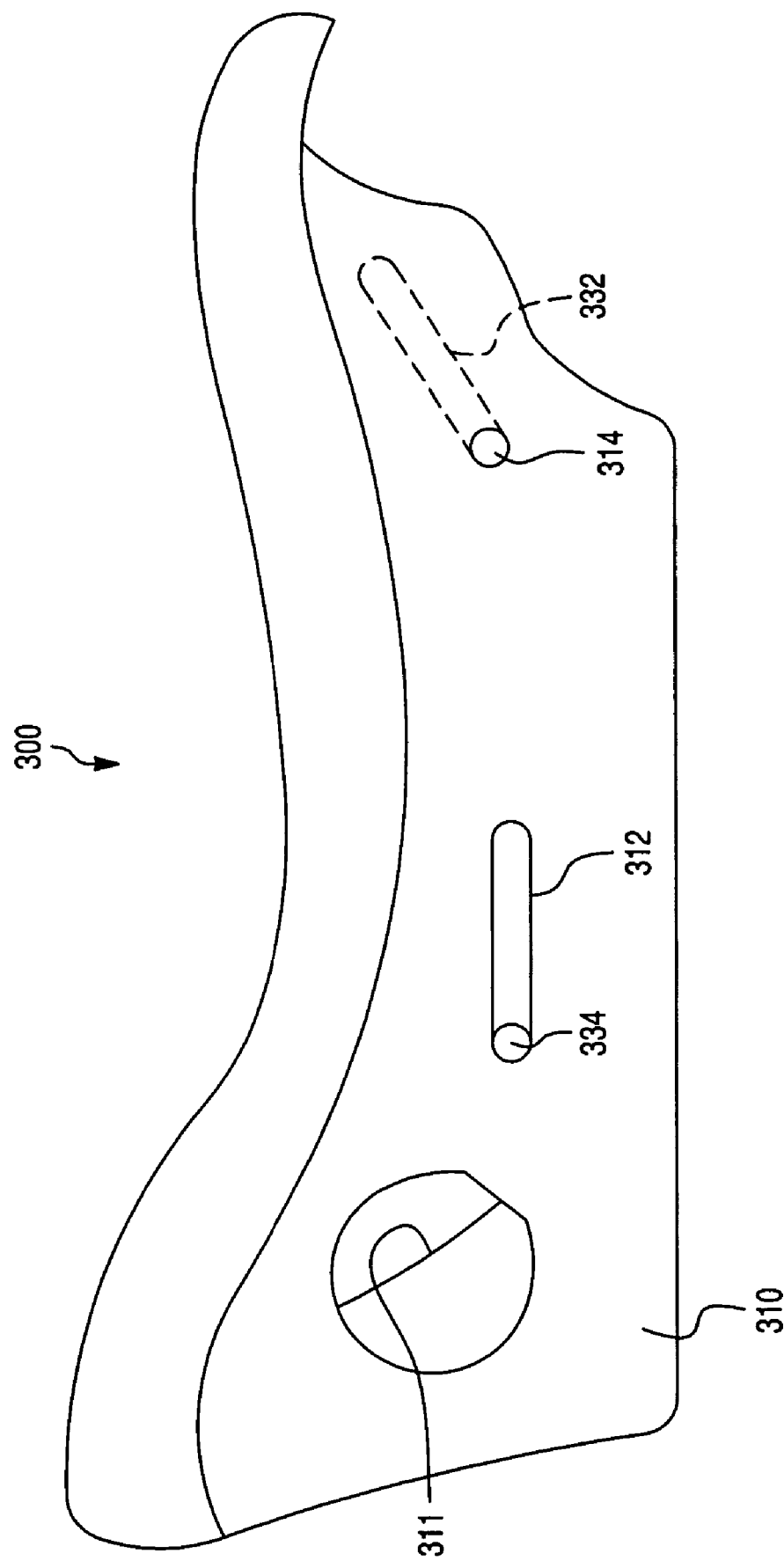

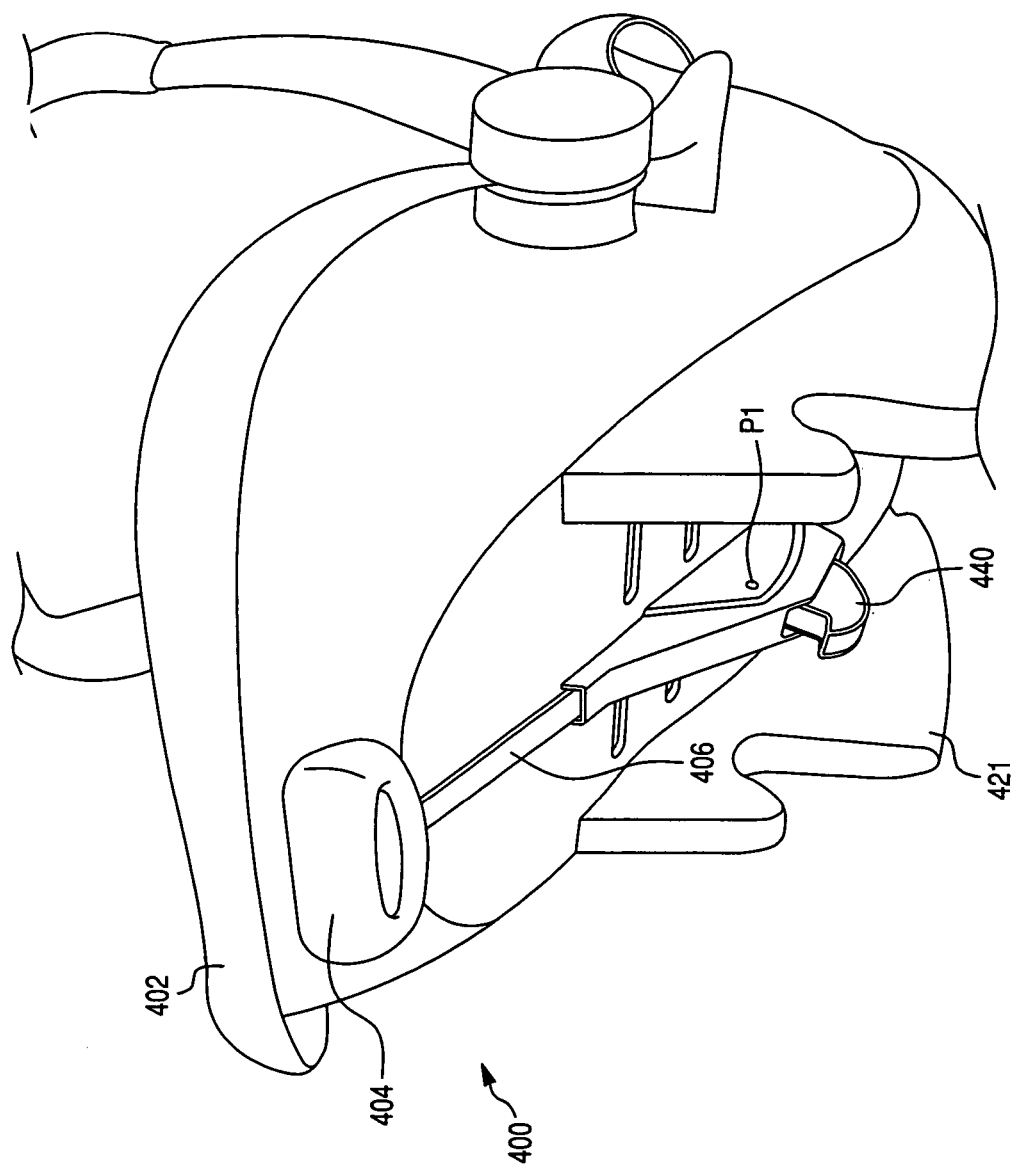

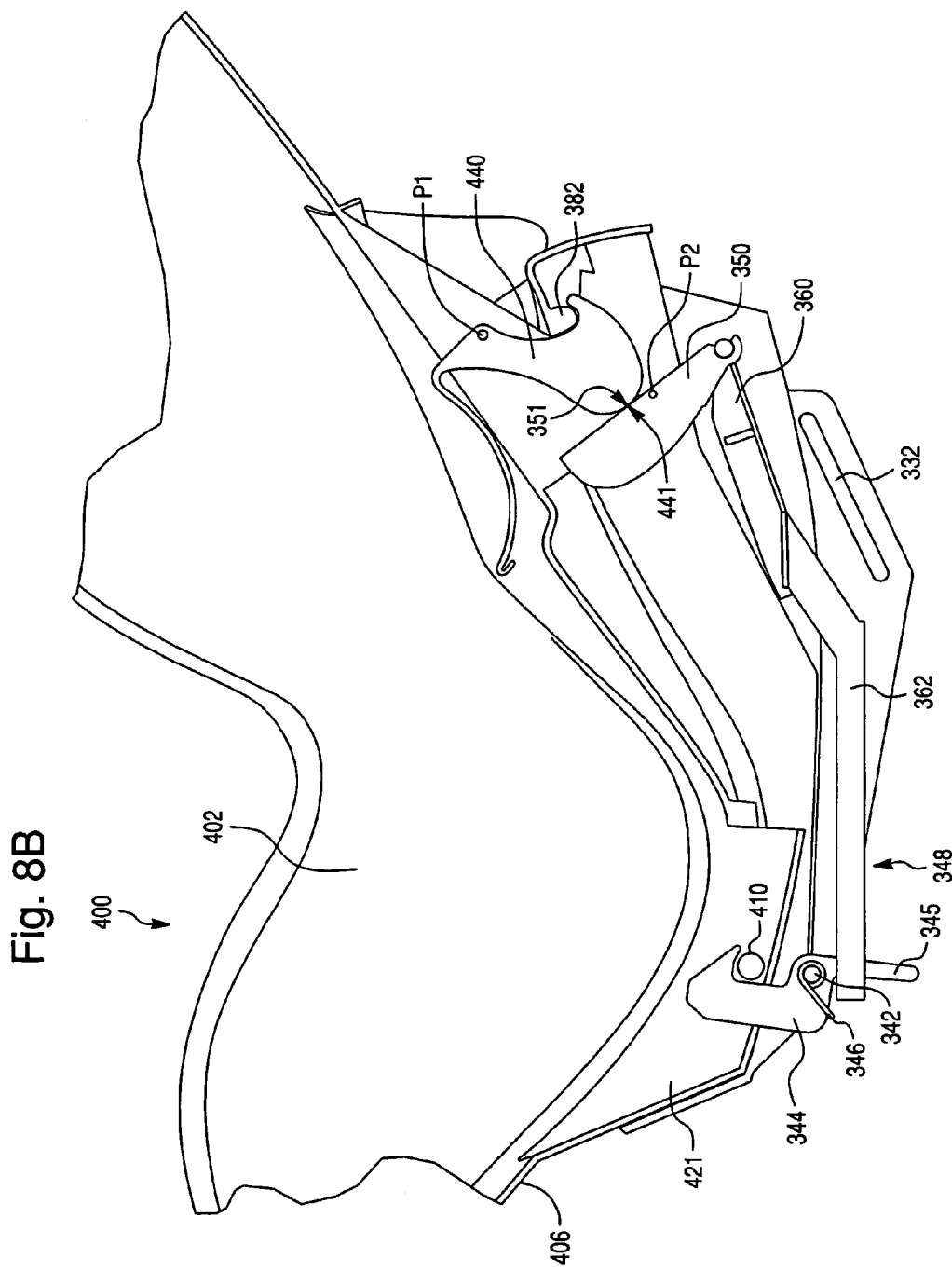

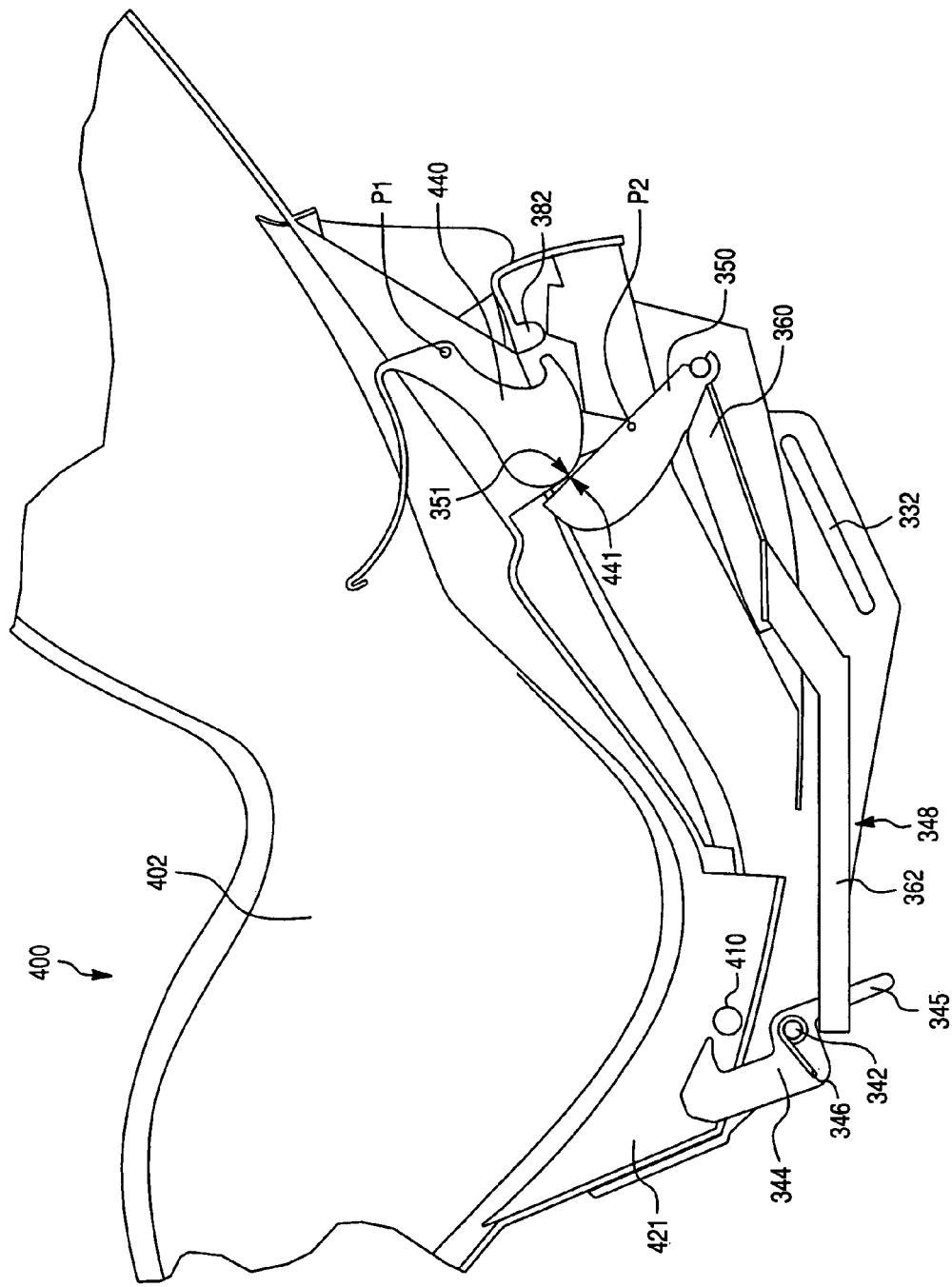

INFANT CAR SEAT

CROSS-REFERENCE TO RELATED APPLICATIONS

This application claims the benefit of U.S. Provisional Application No. 60/525,849, filed Dec. 1, 2003, and U.S. Provisional Application No. 60/561,530, filed Apr. 13, 2004, both of which are incorporated by reference in their entireties.

FIELD OF THE INVENTION

This invention relates to an infant car seat. More specifically, this invention relates to an infant car seat that can accommodate larger and longer infants than conventional infant car seats.

BACKGROUND OF THE INVENTION

The American Academy of Pediatrics (AAP) recommends that newborn babies should ride rear-facing in an automotive vehicle from birth to at least one year and 20 pounds. There are two types of rear-facing car seats: (i) rear-facing only infant car seats that can also be used as carriers, and (ii) convertible car seats that convert from rear-facing to forward-facing as the child grows.

Infant car seats in the market today are popular because of the convenience they offer to parents. Infant car seats have a carry handle, which enables the car seat to be used as a carrier. The carrier capability allows the parent to carry a sleeping child from car to home without disturbing the child. The infant car seats also can be snapped onto a stroller to make a travel system.

Despite the many benefits of infant car seats, the usage of such car seats is limited only to the infant's first six to eight months of life. Most infant car seats are rated by manufacturers for use from birth to 22 pounds. According to data from the National Center for Health Statistics (Revised 2001), a 50th percentile eight month old weighs 20 pounds and measures 28 inches in length. Thus, infants younger than one year may outgrow rated weight and height limits established by manufacturers.

Parents see first symptoms of this outgrowth when they notice that the child's legs and feet extend past the car seat and kick against the vehicle seat back. Parents perceive that this outgrowth makes the child uncomfortable.

Convertible car seats offer an interim solution for children who have outgrown their infant car seat, yet may not be physically ready to face forward. The convertible car seats enable growing infants to stay rear-facing longer by providing additional legroom and room at the top of the seat. However, as compared to infant car seats, convertible car seats are large and heavy because these seats have to fit a toddler usually up to 40 pounds while used in the forward-facing mode. Hence, parents lose the carrying convenience and flexibility offered by rear-facing only infant car seats.

There is a need in the art for an infant car seat that captures the benefits of both infant car seats and convertible car seats.

SUMMARY OF THE INVENTION

An aspect of the present invention relates to an infant car seat that includes a base and a carrier to detachably secure to the base. The carrier has a carrier weight of less than 10 pounds, and the infant car seat has a rated weight of up to 40 pounds.

Another aspect of the present invention relates to an infant car seat that includes a base and a carrier to detachably secure to the base. The carrier includes a seat back. The carrier has a carrier weight of less than 10 pounds, a front surface of the seat back of the carrier has a length greater than about 20 inches, and the infant car seat has a rated weight of at least about 27.5 pounds.

Another aspect of the present invention relates to an infant car seat that includes a base and a carrier to detachably secure to the base. The carrier includes a seat back. The carrier has a carrier weight of less than 10 pounds, a front surface of the seat back of the carrier has a length greater than about 20 inches, and the infant car seat has a rated weight of greater than 22 pounds.

Another aspect of the present invention relates to an infant car seat that includes a base and a carrier to detachably secure to the base. The carrier has a carrier weight of less than 10 pounds, and the infant car seat has a rated height of up to 35 inches.

Another aspect of the invention relates to an infant car seat that includes a base and a carrier to detachably secure to the base. The carrier has an upper rear edge. The carrier is positionable on the base in a first latching position and in a second latching position. When the carrier is secured to the base, the carrier provides legroom measured along a horizontal plane from the upper rear edge of the carrier to a seat back of the vehicle seat. The carrier has a carrier weight of less than 10 pounds and provides legroom of greater than 2 inches in the second latching position.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2 is a top perspective view of an exemplary base of the infant car seat.

FIG. 2A is a top perspective view of another exemplary base of the infant car seat.

FIG. 6B is an exploded, top perspective view of the base assembly of FIG. 6A.

FIG. 6C is a side view of the base assembly of FIG. 6A, in which the movable base is in a first position.

FIG. 8A is a perspective view of a carrier suitable for use with the base assembly of FIG. 6A.

FIG. 8B is a partial cut-away, side view of a carrier coupled to the base assembly of FIG. 6A, in which the carrier is latched to the movable base.

FIG. 8C is a partial cut-away, side view of the carrier and base assembly of FIG. 8A, in which the carrier is unlatched from the movable base.

DETAILED DESCRIPTION OF THE PREFERRED EMBODIMENTS

Reference will now be made in detail to presently preferred embodiments of the invention, examples of which are illustrated in the accompanying drawings. An effort has been made to use the same reference numbers throughout the drawings to refer to the same or like parts.

Figure 1:
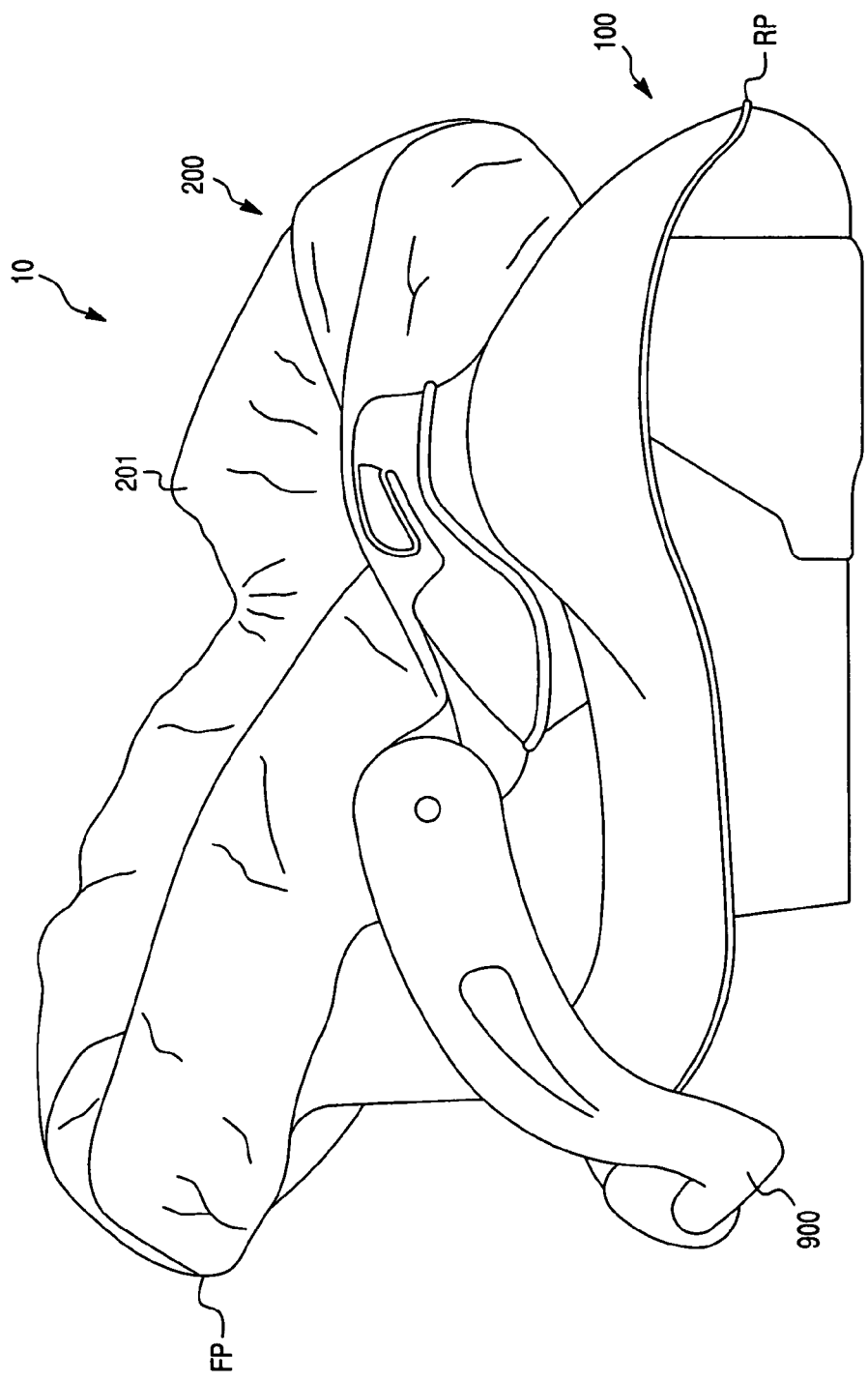
FIG. 1 is a side view of an infant car seat in accordance with the invention.

FIG. 1 illustrates an infant car seat 10 according to an exemplary embodiment of the invention. The infant car seat 10 is engineered to offer the benefits of both a rear-facing only infant car seat and a convertible child seat. In this regard, the infant car seat 10 provides the comfortable fit of a convertible car seat for a growing infant and, simultaneously, provides the mobility of an infant carrier. For example, the infant car seat 10 can have a carrier 200 with a relatively lengthy seat back 210 (see FIG. 9) of about 21 inches in length, for example, 21.5 inches or 21.75 inches in length. Additionally, the infant car seat 10 can have a base 100 and a carrier 200 that can be positioned in two positions on the base 100 to offer a better fit to a larger child, such as a child up to 35 pounds weight and up to 35 inches in length, without compromising the fit of the infant car seat 10 to a vehicle and the fit of the infant car seat 10 to a stroller. In this regard, the infant car seat 10 can provide a small fit envelope in a vehicle as compared to convertible car seats, as well as an interaction capability with a stroller to make a travel system. Further, the ergonomic handle 900 of the carrier 200 and the lightweight carrier seat shell 202 make the infant car seat 10 effective as a carrier. Exemplary infant car seats 10 now will be described.

FIG. 1 illustrates a rearwardly-facing infant car seat 10 according to an exemplary embodiment of the invention. The infant car seat 10 includes a base 100 to secure to a vehicle seat and a carrier 200 to detachably couple to the base 100. The carrier 200 can be latched to the base 100 in two positions, such that, in a first latching position, the carrier 200 can function as a reclined infant car seat for a newborn, and, in a second, more upright latching position, the carrier 200 can accommodate the space needs of a growing infant. FIG. 1 shows the carrier in the first, reclined latching position.

Figure 5:
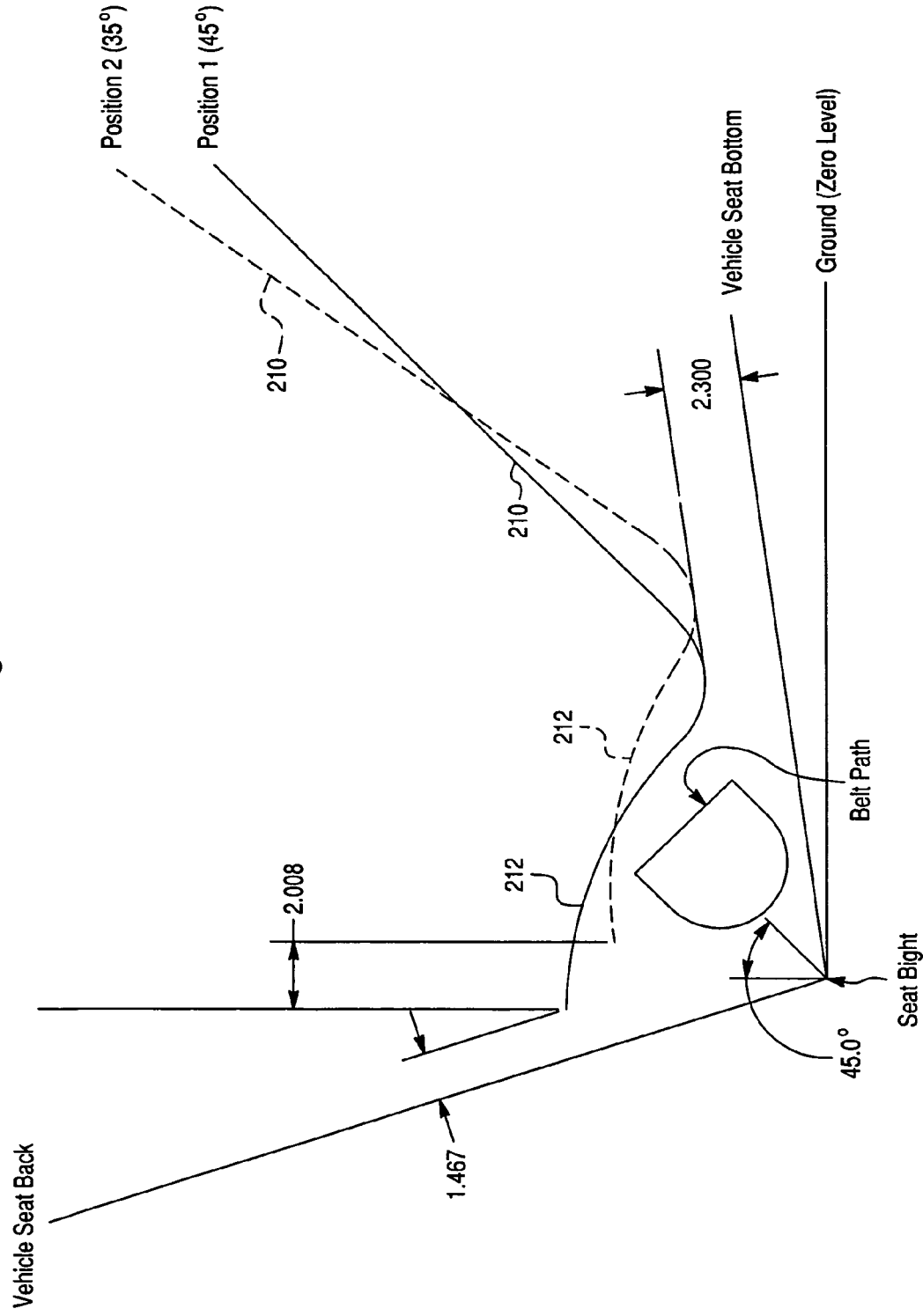
FIG. 5 is a graphical representation of the carrier orientation relative to a vehicle seat in a first position and in a second position.

FIG. 5 illustrates, in graphical form, the angle of the seat back 210 and seat bottom 212 of the carrier in its two latching positions relative to a vehicle seat. FIG. 5 identifies the seat back of the vehicle seat, the seat bottom of the vehicle seat, and the seat bight at the intersection of the seat back and the seat bottom. FIG. 5 also identifies the belt path of the base 100 (also seen as belt path 150 in FIG. 2) across which the vehicle seat belt may pass to secure the base 100 to the vehicle seat. In an embodiment, as shown in FIG. 5, the distance between the vehicle seat back and the rearmost edge of the carrier 200 can be about 1.467 inches; the distance between the rearmost edge of the carrier 200 in the first position and in the second position can be about 2.008 inches; and the distance between the lowermost point of the carrier 200 and the vehicle seat bottom can be about 2.300 inches.

When the carrier is positioned in the first of the two latching positions, appropriate for a newborn, the seat back 210 of the carrier 200 is at an angle of 45° from vertical, where vertical is defined in the vertical plane through the seat bight at the intersection of the vehicle seat back and the vehicle seat bottom. In the second latching position, more appropriate for an older infant with developed neck and shoulder muscles and increased head control, the carrier 200 is rotated upwardly 10° to move the seat back 210 to an angle of 35° from vertical, again where vertical is defined in the vertical plane through the seat bight at the intersection of the vehicle seat back and the vehicle seat bottom. In this second latching position, the growing infant can sit more upright relative to the first latching position and can interact more with the surrounding environment.

Figure 11:
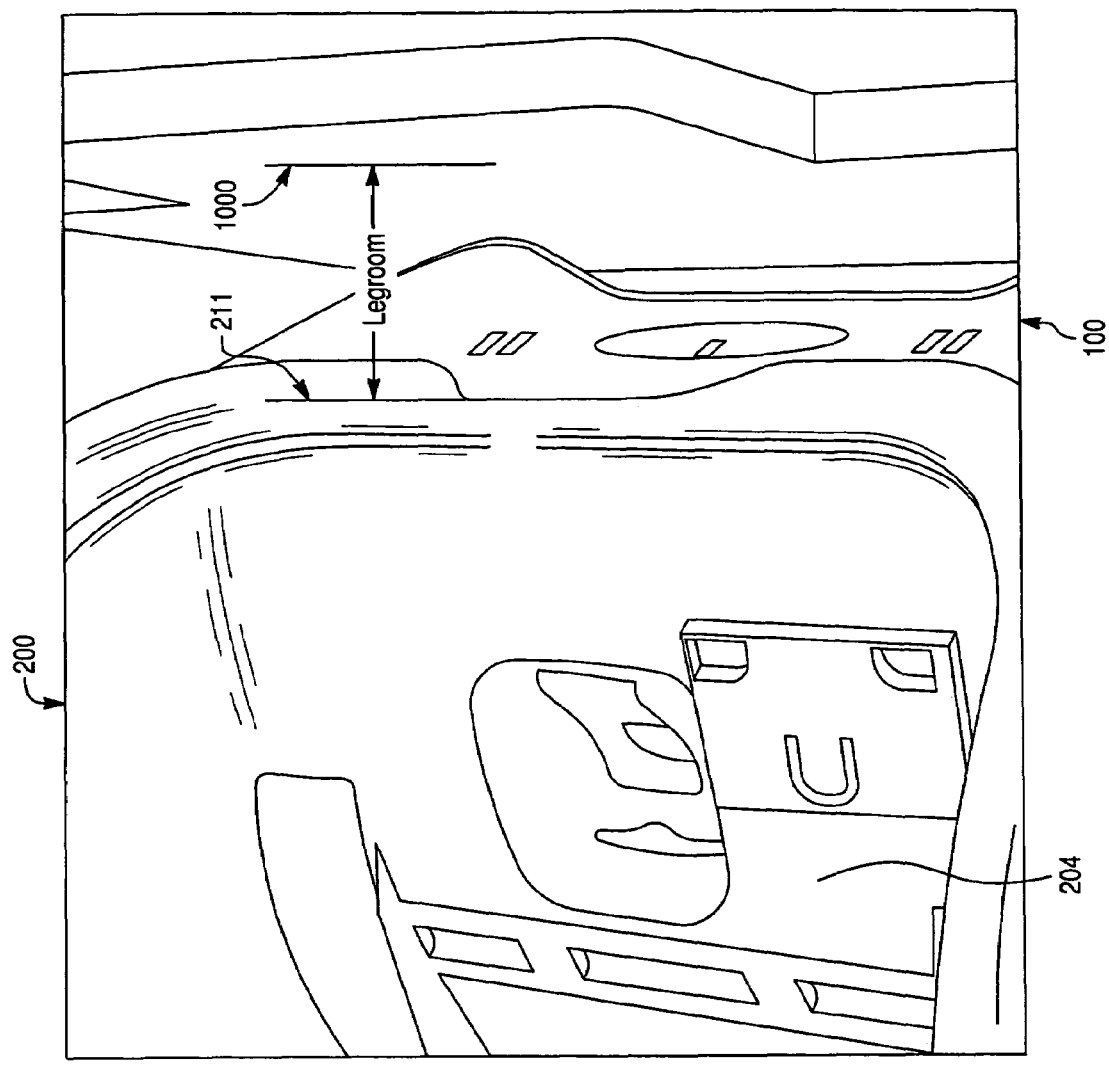
FIG. 11 is a top perspective, detail view of the infant car seat that illustrates the legroom measurement of the infant car seat.

Child anthropometric data suggests that a $95^{th}$ percentile 1 year old ideally needs an additional three inches of legroom relative to a newborn. FIG. 11 illustrates how a legroom measurement of the infant car seat 10 can be taken. The legroom measurement refers to the distance from an upper rear edge 211 of the carrier 200 to a seat back 1000 of the vehicle seat along a horizontal plane. When the carrier 200 of the infant car seat 10 is rotated to the second latching position, the infant car seat 10 can provide up to 3.5 inches of legroom for the infant, or, in another embodiment, up to 2.875 inches of legroom for the infant. For example, in one embodiment, the available legroom ranges from about 1.0 inches of available legroom in the first, reclined latching position to up to about 3.5 inches of available legroom in the second latching position. In another embodiment, the available legroom ranges from about 1.75 inches of available legroom in the first, reclined latching position to up to about 2.875 inches of available legroom in the second latching position. The available legroom of the infant car seat 10 thus can be greater than 2 inches in the second latching position. Accordingly, the infant car seat 10 can accommodate a fairly large infant.

Further, referring to FIG. 1, the infant car seat 10 can have essentially the same overall length in the first latching position and in the second latching position, as measured from the foremost point FP of the infant car seat 10 to the rearmost point RP of the infant car seat 10. The infant car seat 10 has essentially the same overall length in the two latching positions because the rearmost point RP on the base 100 remains the same between the first and second latching positions, and the foremost point FP, which is at the foremost point of the carrier 200, changes only in a vertical direction (see FIG. 5) and not in a front-to-back direction. Hence, the infant car seat 10 can comfortably fit a child through growth from a newborn to a large infant, yet does not require additional space inside the vehicle during the child's growth.

The structure of the base 100 and the detachable and repositionable carrier 200 now will be described.

Referring to FIG. 2, the base 100 can comprise a molded shell 102 that has sidewalls including a front wall 104, a rear wall 106, and opposing sidewalls 108. Each of the opposing sidewalls 108 includes a belt aperture 110 to allow passage of the vehicle seat belt. A belt path 150 extends across an upper surface 114 of the base 100, between the belt apertures 110, along which the vehicle belt can pass to secure the base 100 to the vehicle. Because the belt path 150 is associated with the base 100, not the carrier 200, and remains fixed in location on the base 100, the carrier 200 can be moved between the first latching position and the second latching position without requiring adjustment of the vehicle belt. Additionally, the belt path 150 can include a lock-off mechanism 152 to lock the vehicle belt to the base 100. Suitable lock-off mechanisms 152 are described in copending U.S. application No. 10/999,144, entitled LOCK-OFF MECHANISM FOR CHILD SEAT, filed Nov. 30, 2004, which is incorporated by reference in its entirety. The lock-off mechanism 152 can be connected directly to the seat shell 102 or it can be formed as part of a larger molded assembly (such as an integrally molded lock-off mechanism and belt path cover) that is otherwise secured to the belt path 150 of the shell 102.

The base 100 further includes first and second latch receivers that correspond to the first reclined, latching position and the second upright, latching position, respectively. In the illustrated embodiment, the first latch receiver comprises a first pair of U-shaped latching bars 120 that are fixed to opposite sides of the upper surface 114 of the base shell 102, and the second latch receiver comprises a second pair of U-shaped latching bars 122 fixed to opposite sides of the upper surface 114 of the base shell 102. The carrier 200 can be coupled to either of the pairs of latching bars 120, 122. Latching bars 120 can fix the carrier 200 in the first position at a 45° angle from vertical, and latching bars 122 can fix the carrier in the second position at a 35° angle from vertical. Latching bars 120 are closer to the rear wall 106 of the base shell than latching bars 122.

Figure 3A:
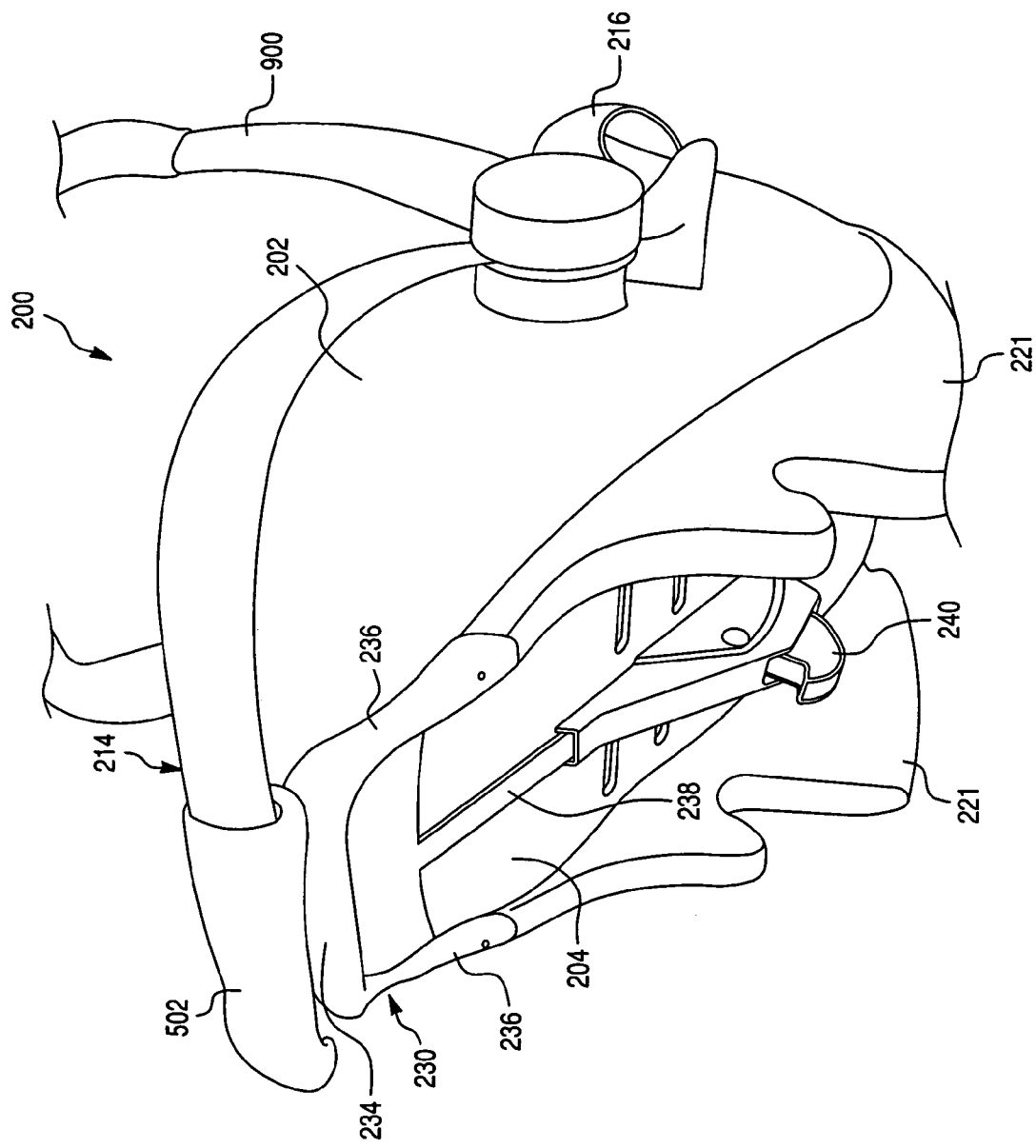
FIG. 3A is a perspective view of a carrier of the infant car seat suitable for use with the base of FIG. 2.
Figure 3B:
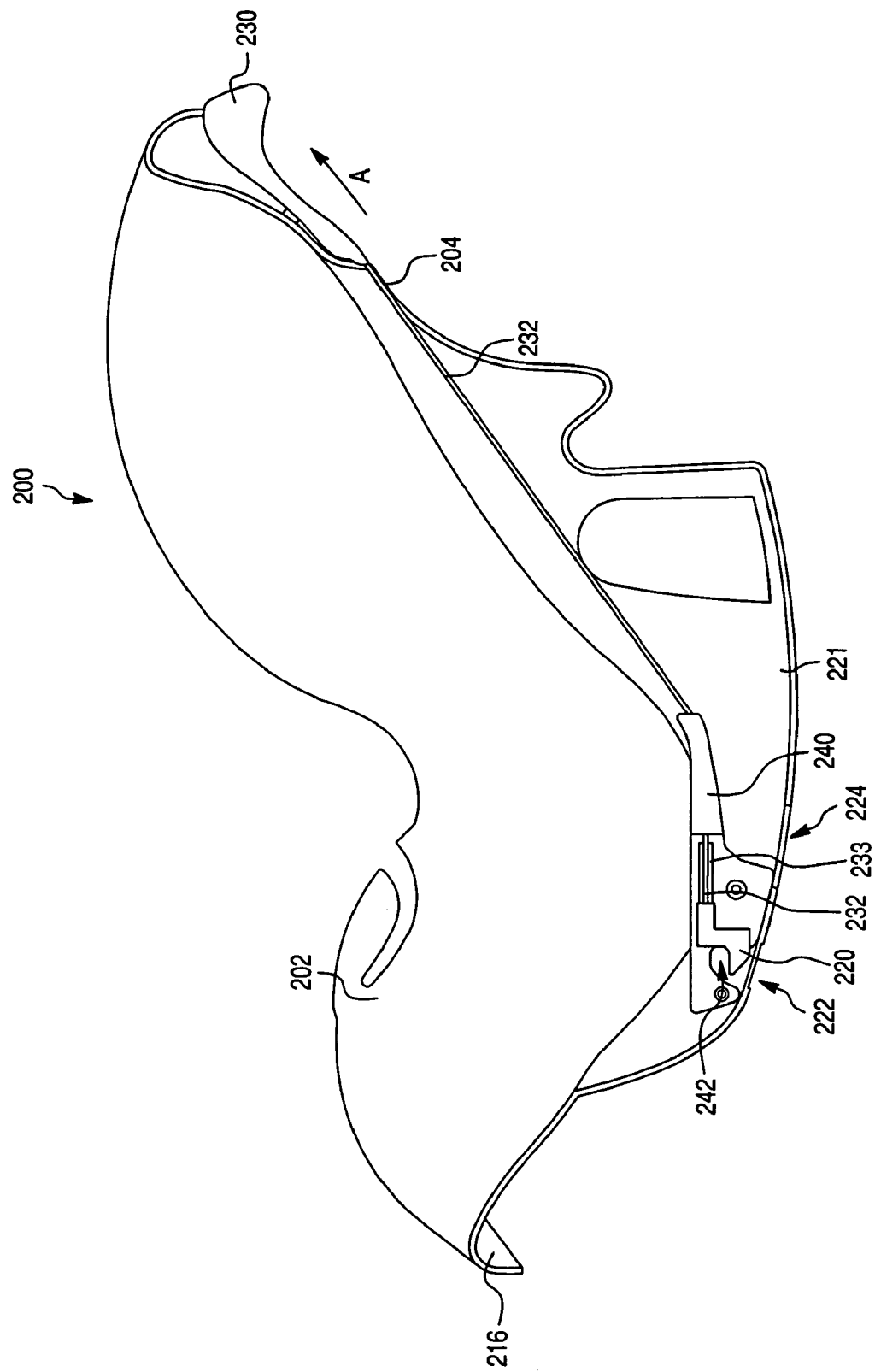
FIG. 3B is a partial cut-away, side view of the carrier of FIG. 3A, illustrating the latch of the carrier.

FIGS. 3A and 3B illustrate an exemplary carrier 200 to be secured to the base 100. The carrier 200 generally includes a molded shell 202 that has a lower surface 204 for securement to the base 200 and an upper surface 206 that defines an infant seating area. The upper surface 206 of the seat shell 202 has a seat back 210 and a seat bottom 212. A perimeter, generally indicated 214 in FIG. 9, defines the outer boundary of the upper surface 204 of the seat shell 202. The seat shell 202 also has an outer rim 216, as best seen in FIG. 3A, that at least partially encircles the infant seating area.

The carrier 200 also can include first and second latches 220 on opposite sides of the seat shell 202 for releasable engagement with the first latching bars 120 and the second latching bars 122 to position the carrier 200 in the first latching position and the second latching position, respectively. The structure and operation of the latches 220 will be described in connection with FIGS. 3A, 4A, and 4B, which illustrate only one of the latches 220 on one side of the seat shell 202; it will be understood that the latch 220 on the opposite side of the seat shell 202 is structured and operates the same as the one shown in FIGS. 3A, 4A, and 4B.

Figure 4A:
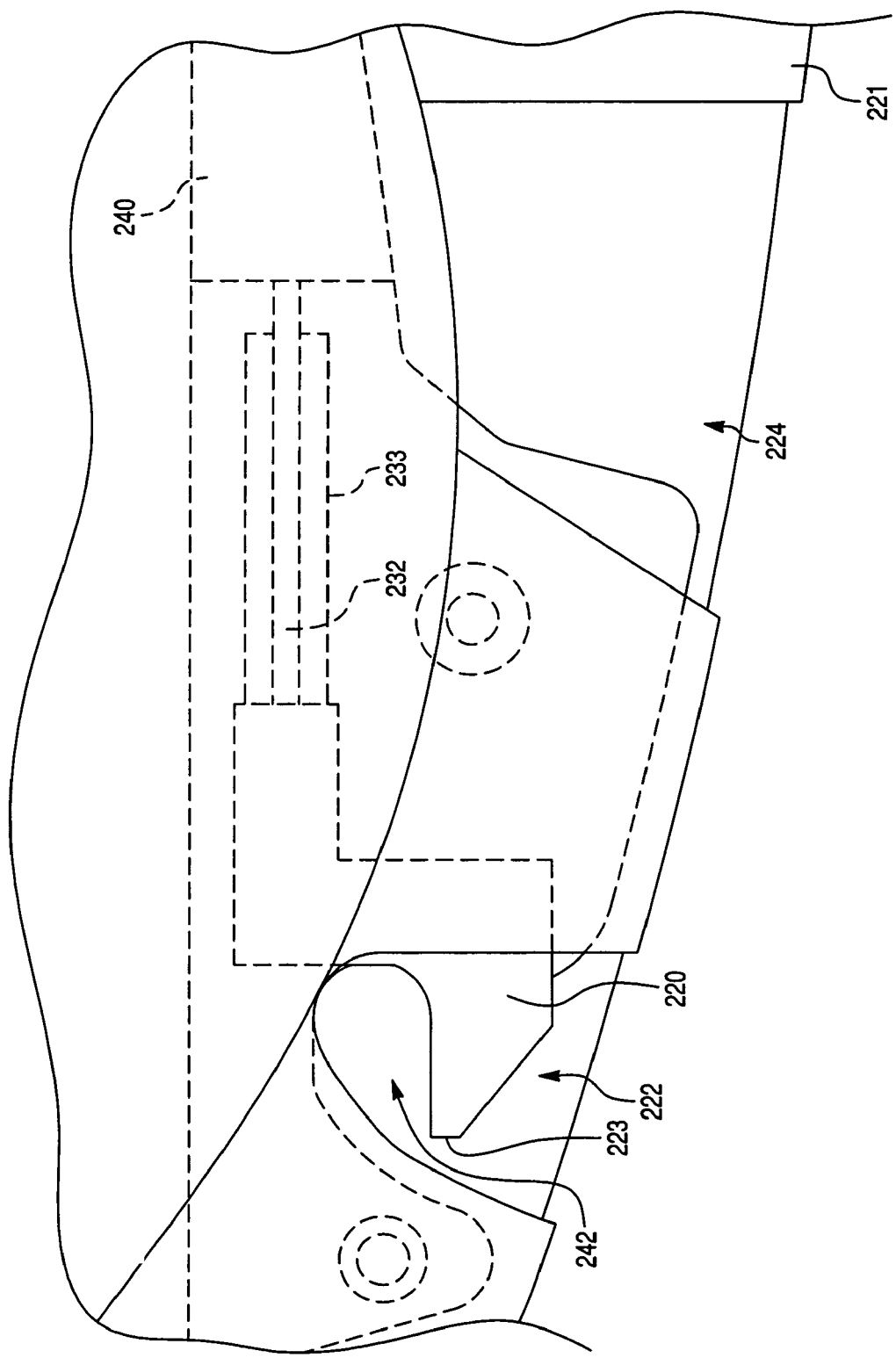
FIG. 4A is an enlarged, detail view of a latch of the carrier of FIG. 3A, illustrating the latch in a closed, latched position.
Figure 4B:
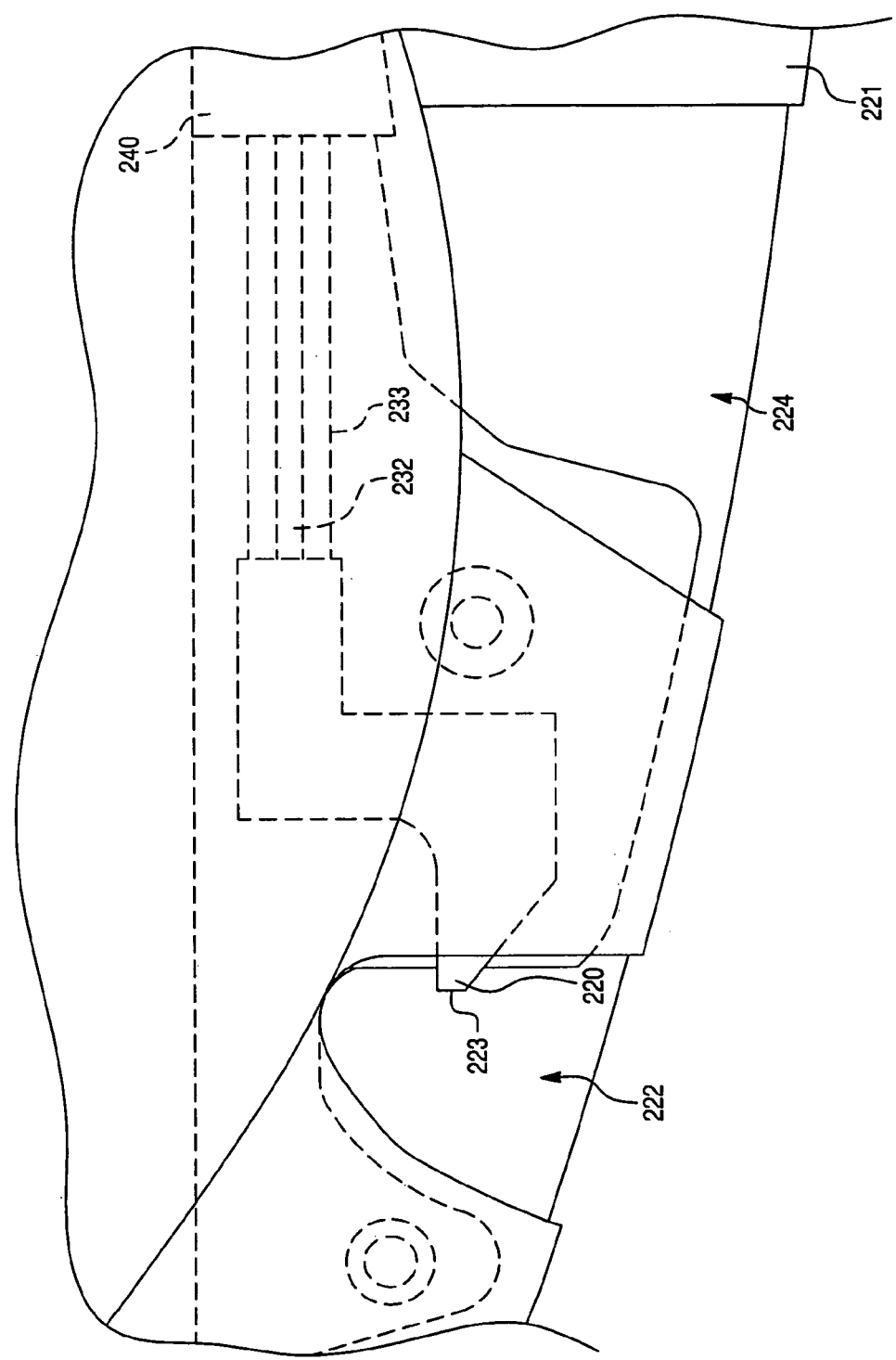
FIG. 4B is an enlarged, detail view of a latch of the carrier of FIG. 3A, illustrating the latch in an open, unlatched position.

The latches 220 are housed in respective curved supports 221 on either side of the lower surface 204 of the carrier shell 202. Each curved support 221 includes a first recess 222 and a second recess 224. The latch 220 can move into and out of the first recess 222 between a latched position and an unlatched position, as shown in FIGS. 4A and 4B, respectively. That is, the latch 220 can slide linearly into and out of the respective first recess 222. The second recess 224 in the curved support 221 is positioned to receive the respective second latching bar 122 of the base 100 when the carrier shell 202 is coupled to the first latching bars 120 in the first reclined position.

Figure 9:
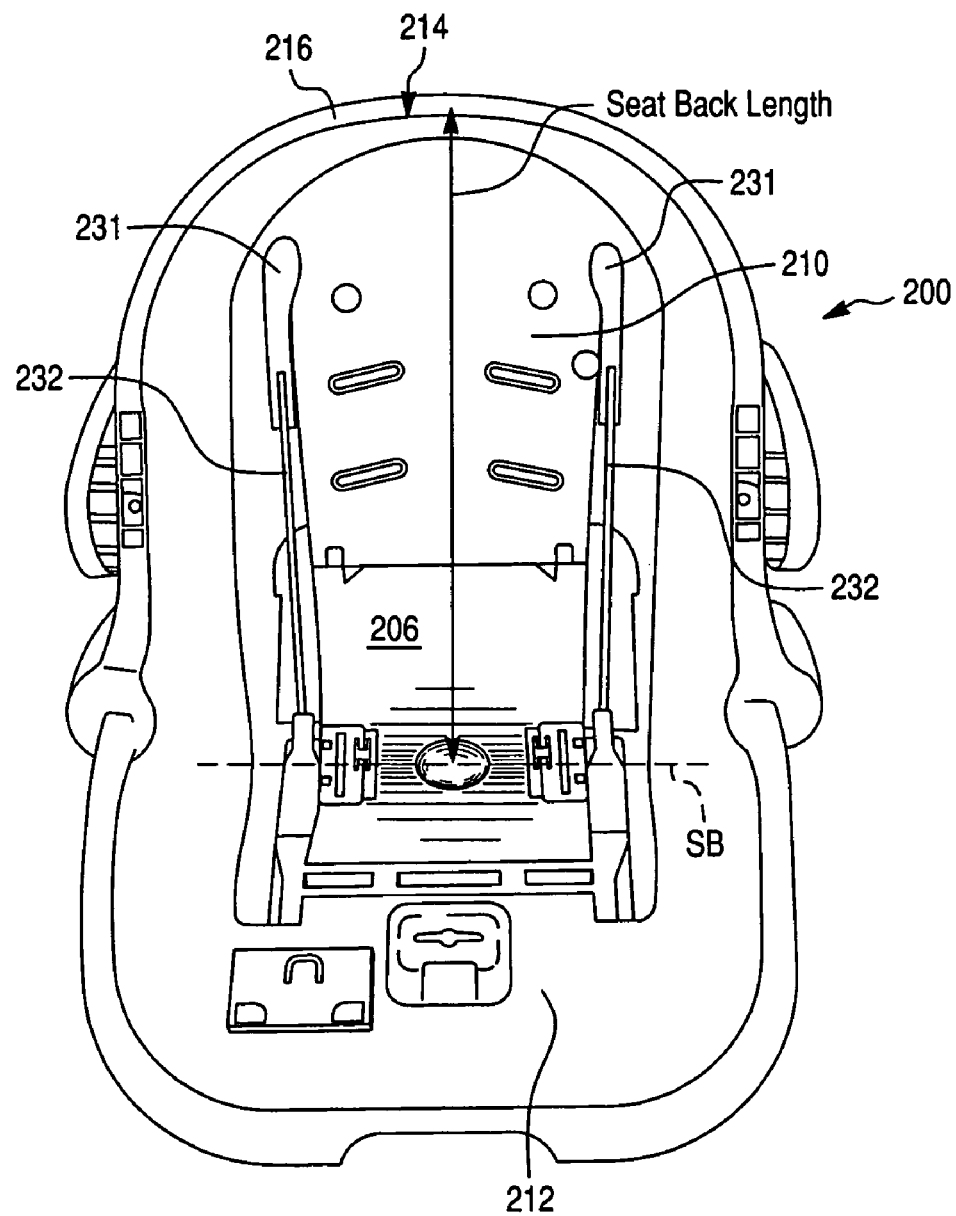
FIG. 9 is a front elevation view of a carrier that illustrates the seat back length measurement of the carrier.

To actuate the first and second latches 220, the carrier 200 includes a release handle 230, as shown in FIG. 3A. The release handle 230 can be coupled to the latches 220 by first and second connecting rods 232 (see FIG. 9), respectively. The release handle 230 is slidably mounted to the lower surface 204 of the carrier shell 202, opposite the back rest 210. The release handle 230 remains accessible to a caregiver when the carrier 200 is coupled to the base 100. The release handle 230 has a central section 234 with a grip detail and two arms 236 that extend along the lower surface 204 in the direction of the curved supports 221. The connecting rods 232 fit within channels on the upper surface 206 of the carrier shell 202. A first end of each connecting rod 232 connects to a respective handle arm 234, as shown in FIG. 9, and a second end of each connecting rod 232 extends through a latch housing 240 and connects to the respective latch 220, as shown in FIG. 3B. The latches 220 each have a hooked end 223 that cooperates with the respective recess 222 to encircle a selected latching bar 120, 122 in latch pocket 242. As can be understood from FIG. 3B, when the release handle 230 is actuated (moved in the direction of arrow A), the connecting rods 232 slide the latches 220 from the closed, latched position of FIG. 4A to the open, unlatched position of FIG. 4B. The carrier 200 then can be repositioned from one latching position to the other latching position. When the release handle 230 is released, the latches 220 resume their closed, latched position. The latches 220 can be biased in the closed, latched position by springs 233.

Although the illustrated embodiment contemplates only first and second latching positions, it will be understood that the base of the infant car seat can be equipped with more than two latching positions.

In addition to the latching bars 120, 122, the base 100 can include a pair of receptacles 140, 142 corresponding to the first and second latching positions, respectively, as shown in FIG. 2. Further, as shown in FIG. 3A, the carrier 200 can include a hook 240 to engage the receptacles 140,142. Thus, when the carrier 200 is coupled to the base 100 in the first latching position, latches 220 engage latching bars 120, and the hook 240 engages receptacle 140. When the carrier 200 is coupled to the base 100 in the second latching position, latches 220 engage latching bars 122, and the hook 240 engages receptacle 142. The hook 240 can be pivotally coupled to the seat shell 202 and connected to a central arm 238 of the handle 230 so that, when the handle 230 is moved in the direction A in FIG. 3B, the hook 240 can rotate away from and disengage from the respective receptacle 140, 142.

Figure 2B:
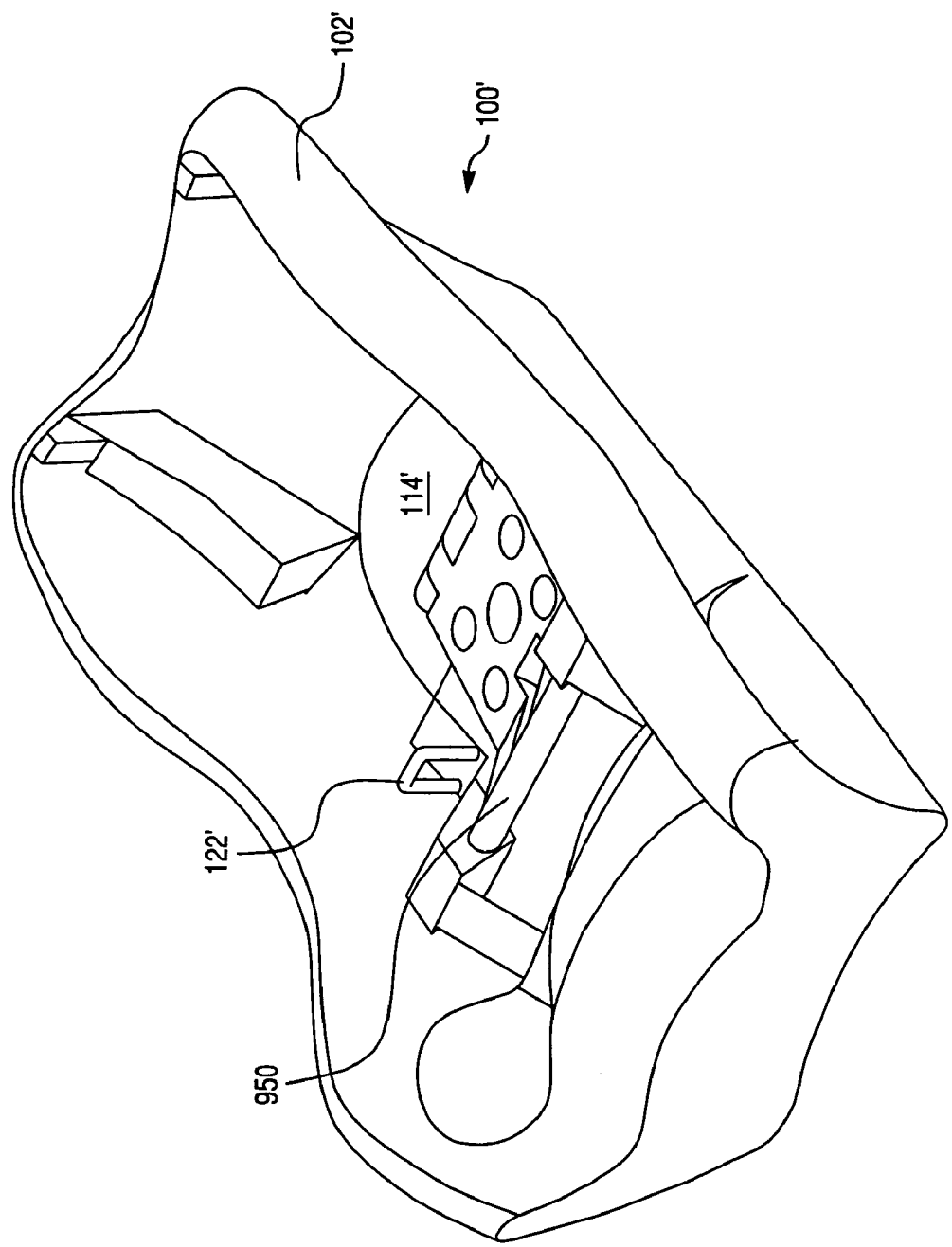
FIG. 2B is a top perspective view of the base of FIG. 2A.

To simplify latching between the first and second latching positions, the base can include a user interface, such as a cover, designed so that only one pair of latching bars 120, 122 is exposed at a given time. For example, FIG. 2A illustrates an embodiment of a base 100' that includes a cover 950 to cover the first latch receivers 120' when not in use. The cover 950 can be pivotally attached to an upper surface 114' of the base shell 102'. When a carrier is to be coupled to the base 100' in the second position, the cover 950 can be pivoted from its orientation in FIG. 2A to its orientation in FIG. 2B so that latching bars 120' are covered. Another example of such a user interface can comprise a sliding cover per side of the base 100 that slides between and over the respective first and second latching bars 120, 122 so that, at any given time, either the first or the second latching bar 120, 122 is covered. Another example of such a user interface can comprise a cover per side of the base 100 that can flip between and over the respective first and second latching bars 120, 122 so that, at any given time, either the first or the second latching bar 120, 122 is covered. Another example of such a user interface can comprise a swivel plate per side of the base 100 that can swivel between and over the respective first and second latching bars 120, 122 so that, at any given time, either the first or the second latching bar 120, 122 is covered. Other swivel mechanisms can be conceived that swivel or rotate along difference axes and planes to cover one or the other of the respective latching bars 120, 122. The user interface can aid the user in making a choice of positions at which the infant seat 200 will be latched to the base 100. Thus, the user interface can facilitate latching of the carrier 200 in the intended position.

FIGS. 6A-8C illustrate an alternative base 300 and infant carrier 400 to achieve a two position fit between an infant carrier and a base. As with the embodiment of FIGS. 1-5 described above, the carrier 400 of this embodiment can function in a first position as a reclined infant car seat for a newborn, and, in a second, more upright position, the carrier 400 can accommodate the space needs of a growing infant. The carrier 400 can be structurally similar to carrier 200. However, as compared to carrier 200, carrier 400 can have two pins 410 in curved supports 421 on either side of the lower surface 406 of the carrier shell 402 (see pin 410 in one of the curved supports 421 in FIGS. 8B and 8C), instead of latches 220. Also, carrier 400 can have a release actuator, such as handle 404, that includes only a single arm 406 extending to a hook 440, instead of a handle 230 that has a central arm 238 extending to a hook 240 and two additional side arms 236.

As shown in FIGS. 6A-6D, the base 300 is an assembly that includes a fixed base 310 and a movable base 330 that can move relative to the fixed base 310. The fixed base 310 includes a belt path 311 along which a vehicle belt can be secured to the base assembly 300, such that the movable base 330 can be moved between a first position and a second position, as described below, without requiring adjustment of the vehicle belt relative to the fixed base 310.

In the embodiment of FIGS. 6A-8C, the movable base 330 can slide between a first position (see FIG. 6C) and a second position (see FIG. 6D) relative to the fixed base 310. When the movable base 330 is in the first position, and the infant carrier 400 is coupled to the base assembly 300, as will be described below, the infant carrier 400 is at an orientation appropriate for a newborn; for example, in the first position, the seat back of the carrier 400 can be at an angle of 45° from vertical. When the movable base 330 is in the second position, and the infant carrier 400 is coupled to the base assembly 300, the infant carrier 400 is at an orientation more appropriate for an older infant with developed neck and shoulder muscles and increased head control; for example, in the second position, the seat back of the carrier 400 can be at an angle of 35° from vertical. In this second position, the growing infant can sit more upright relative to the first position and can interact more with the surrounding environment.

Figure 6A:
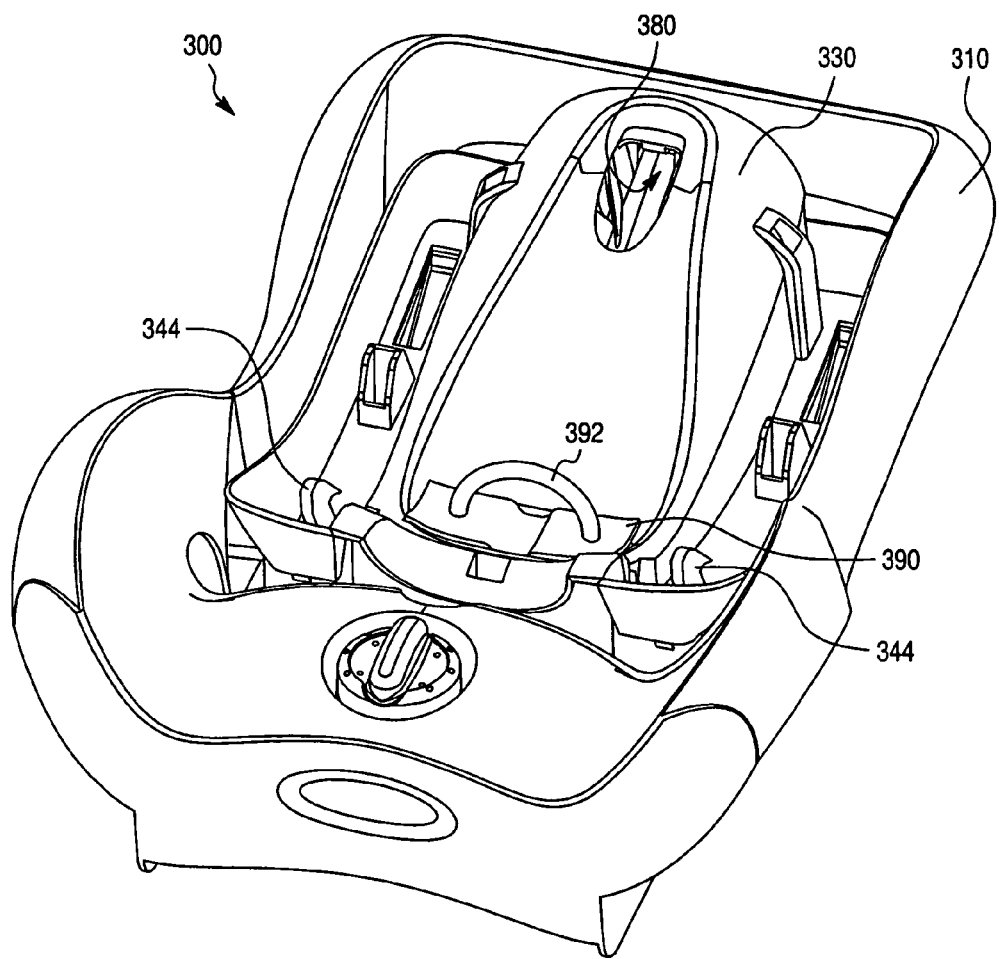
FIG. 6A is a top perspective view of a base assembly of another exemplary infant car seat, in which the base assembly includes a fixed base and a movable base.
Figure 6D:
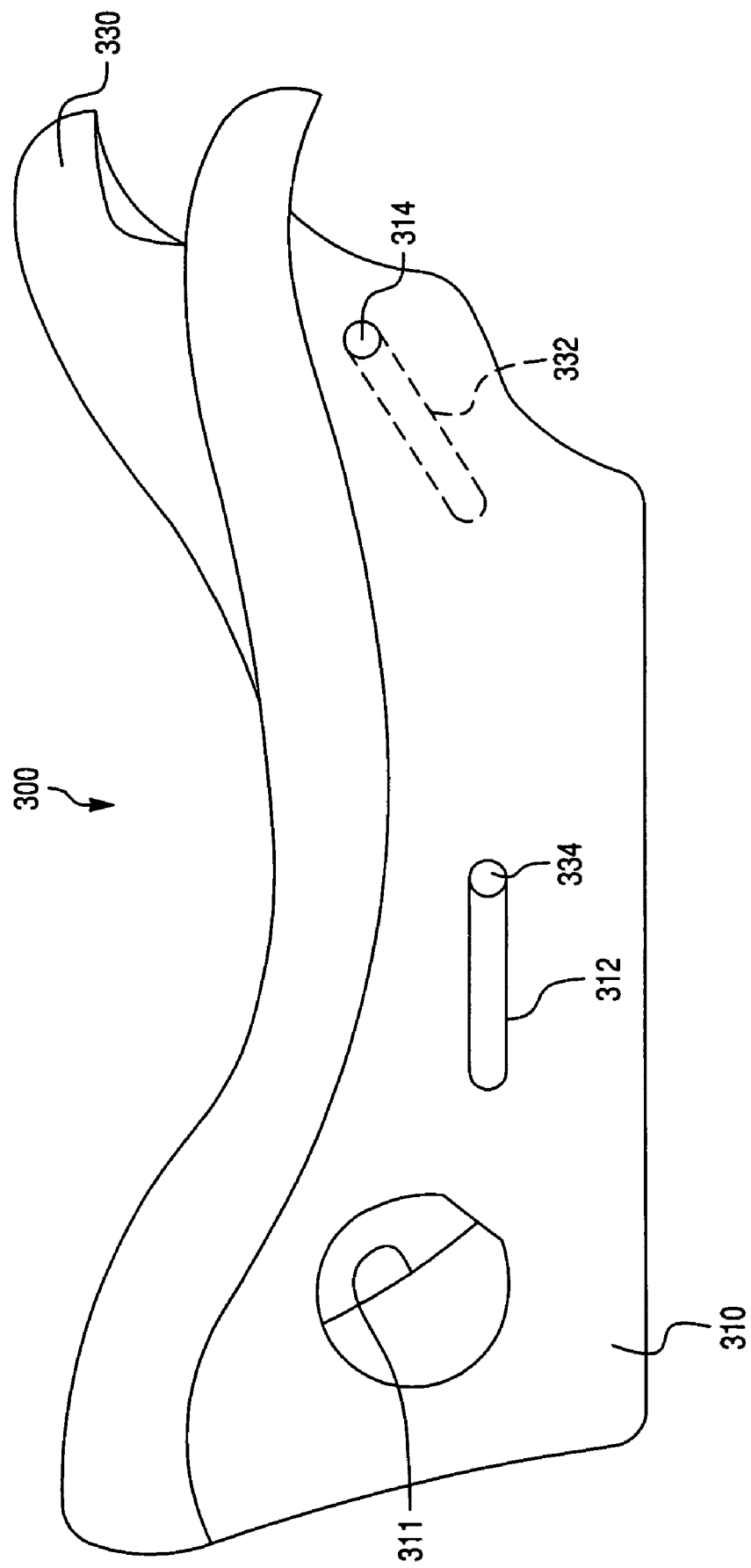
FIG. 6D is a side view of the base assembly of FIG. 6A, in which the movable base is in a second position.

FIGS. 6C and 6D show the base assembly 300 in the first and second positions, respectively. In FIG. 6C, illustrating the first position, the movable base 330 is obscured by the sidewall of the fixed base 310. In FIG. 6D, illustrating the second position, the movable base 330 extends above an upper edge of the sidewall of the fixed base 310. To enable movement of the movable base 330 on the fixed base 310, the fixed base 310 includes a slot 312 along each of its sidewalls and a pin 314, and the movable base 330 includes a slot 332 along each of its sidewalls and a pin 334. Slot 312 of the fixed base 310 can slidably receive pin 334 of the movable base 330, and slot 332 of the movable base 330 can slidably receive pin 314 of the fixed base 310. In the first position, as shown in FIG. 6C, the pins 314, 334 are positioned at one end of the respective slots 332, 312. In the second, more upright position, as shown in FIG. 6D, the pins 314, 334 are positioned at the other end of the respective slots 332, 312. As can be understood from comparing FIGS. 6C and 6D, when a carrier 400 is secured to the movable base 330, the carrier 400 will assume a more upright orientation in the second position than in the first position.

To lock the movable base 330 in one of the two positions in the fixed base 310, the fixed base 310 can include a pair of receiving apertures 320, 322, and the movable base 330 can include a locking actuator 390 that can be received in either of apertures 320, 322, as shown in FIGS. 6A and 6 B. The locking actuator 390, which can be a block-like member having a handle 392, fits in a slot 391 (see FIG. 7) in the movable base 330. When the locking actuator 390 is lifted out of the slot 391 in the movable base 330, the movable base 330 can slide between the first and second positions shown in FIGS. 6C and 6D, respectively. To lock the movable base 330 in the first position, the movable base 330 can be slid to the position shown in FIGS. 6A and 6C, in which slot 391 and receiving aperture 320 are aligned, and the locking actuator 390 can be placed through the slot 391 and into the receiving aperture 320. To lock the movable base 330 in the second position, the movable base 330 can be slid to the position shown in FIG. 6D, in which slot 391 and receiving aperture 322 are aligned, and the locking actuator 390 can be placed through the slot 391 and into the receiving aperture 322.

Attachment of the carrier 400 to the movable base 330 now will be described with reference to FIGS. 7, 8A, 8B, and 8C. The movable base 330 generally can include a front rod 342, two latch hooks 344, two torsion springs 346, a release link 348, and a lever link 350. As part of the mechanism for latching the carrier shell 400 to the base 300, the carrier shell can include a release actuator, such as a handle 404, and a hook 440.

To retain the carrier shell 402 on the base 300, the carrier shell 402 can have a pin 410 on each curved support 421, as mentioned above. The pins 410 can be releasably engaged by the latch hooks 344 on the movable base 330. In addition, hook 440 of the carrier 400 can engage a shoulder 382 of the movable base 330 via hook-receiving slot 380. Movement of the movable base 330 between the first position shown in FIG. 6C and the second position shown in FIG. 6D thus moves the carrier 400 between a reclined position and an upright position, respectively. When the release handle 404 is actuated, the hook 440 pivots away from shoulder 382, and the latch hooks 344 of the movable base 330 also pivot, as will be described below, to release the carrier 400 from the movable base 330.

Referring to FIGS. 8B and 8C, when the carrier 400 is installed on the movable base 330, the hook 440 on the carrier 400 and the lever link 350 on the movable base 330 make surface contact with each other. That is, surface 351 of the lever link 350 contacts surface 441 of the hook 440. When the handle 404 of the carrier 400 is actuated, the hook 440 rotates and slides along surface 351 of the lever link 350 to cause actuation of the remaining components of the latch mechanism of the movable base 330, as now will be described.

Figure 7:
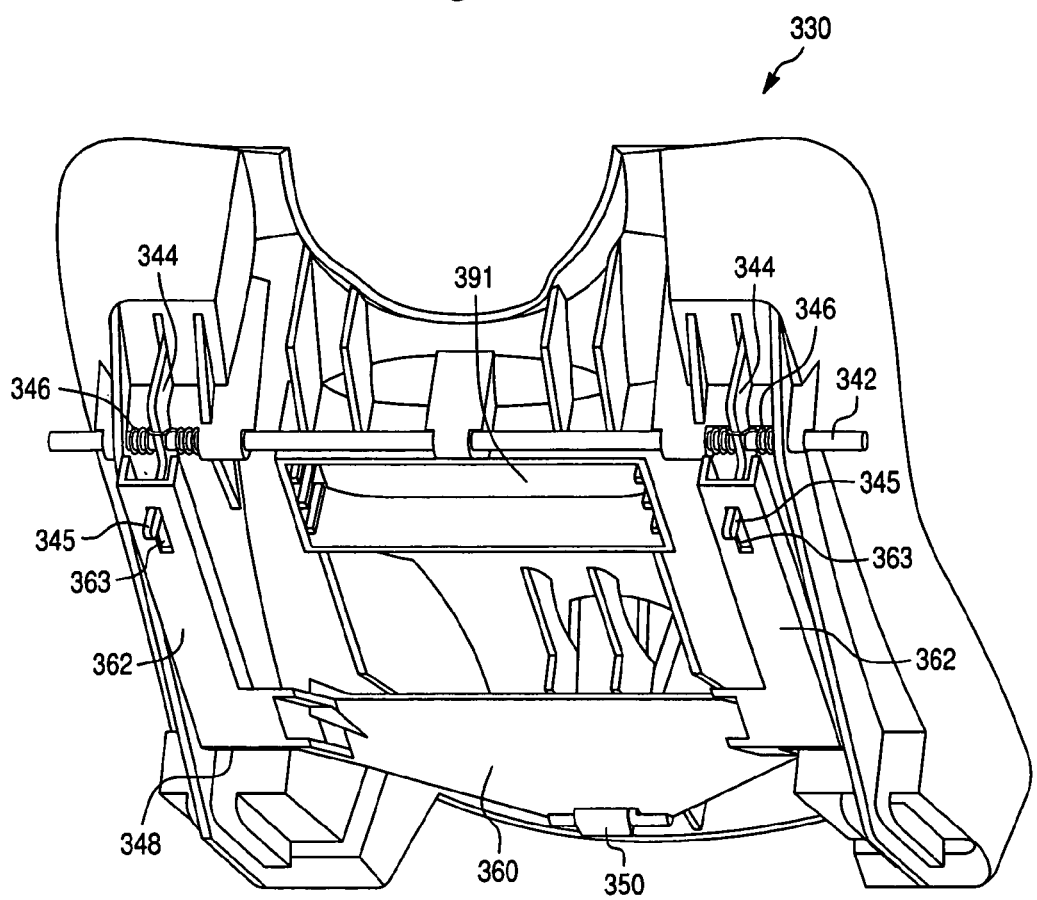
FIG. 7 is a bottom perspective view of the movable base of the base assembly of FIG. 6A.

To release the carrier 400 from the base 300, a user can squeeze the handle 404 on the carrier shell 402. Squeezing the handle 404 triggers rotating movement of the hook 440 about pivot P1 away from the shoulder 382 in the hook-receiving slot 380 in the movable base 330. Rotation of the hook 440 causes rotation of the lever link 350 about a center pivot point P2 of the lever link 350. The lever link 350 is pivotally attached to the base 330 and is snapped onto the release link 348 that extends between the lever link 350 and each of the latch hooks 344. In this regard, as seen in FIG. 7, the release link 348 has a central section 360 and two arms 362 that extend from the central section 360 to each of the latch hooks 344. The latch hooks 344 each have a tail 345 that extends through a slot 363 at the end of the respective release link arm 362. Rotation of the lever link 350 moves the release link 348 from a rest position, as shown in FIG. 8B, to an actuated position, as shown in FIG. 8C. As the release link 348 moves, the latch hooks 344 rotate around the front rod 342 and away from the receiving pins 410 of the infant carrier 400, thereby releasing the infant carrier 400 from the base 300. The two torsion springs 346 return the latch hooks 344, the release link 348, and the lever link 350 to the rest position when force from the handle 404 is removed.

FIGS. 8B and 8C illustrate that the kinematic motion of parts can be achieved by pivotal rotation of one part (hook 440) causing another contacting part (lever link 350) to rotate. The hook 440 and the lever link 350 can be molded parts. The hook 440 can have a protrusion at its pivot point P1 via which the hook 440 can be snapped onto the carrier shell 402. The lever link 350 likewise can have a protrusion at its pivot point P2 that can be snapped onto the underside of the movable base 330. The hook 440 and the lever link 350 are in constant contact while the infant carrier 400 is mounted to the movable base 330, so that, as one part rotates, the other part also rotates due to surface contact between the parts.

The embodiment of FIGS. 6A-8C provides an advantage as compared to conventional infant car seats. Infant carriers are generally heavy since they must be structurally robust to withstand crash impact energy and since the latching features on the carrier are typically made of steel. Relocating certain steel latching features to the movable base 330 reduces the weight of the infant carrier 400 and, hence, reduces user discomfort and fatigue resulting from transporting the carrier. Moreover, because the infant car seat can be rated to a high weight range of, for example, 5-30 pounds, and because the seat back height is relatively long at, for example, 21.5 inches, a way to compensate for the added weight of the plastic carrier is to transfer latching features from the carrier to the base.

Data in Tables 1 and 2 below compares an infant car seat in accordance with the invention to eight other commercially available infant car seats, namely, Seats 1-8. Each measurement parameter will be discussed below in detail (although the discussion will refer to the infant car seat embodiment of FIGS. 1-5 for ease of understanding, the discussion also is applicable to the infant car seat embodiment of FIGS. 6A-8C).

TABLE 1

| Seat Name/ Seat Features | Carrier Weight | Rated Weight | Rated Height | Seat Back Length |
| --- | --- | --- | --- | --- |
| Seat 1 | 8 lbs. | 20 lbs. | 26" | 18" |
| Seat 2 | 9 lbs. | 28.6 lbs. | 29" | 20" |
| Seat 3 | 8.5 lbs. | 22 lbs. | 29" | 19" |
| Seat 4 | 8.75 lbs. | 22 lbs. | 26" | 18" |
| Seat 5 | 7 lbs. | 22 lbs. | 26" | 19" |
| Seat 6 | 6.25 lbs. | 22 lbs. | 29" | 19" |
| Seat 7 | 10 lbs. | 35 lbs. | 35" | 19.5"-21.5" |
| Seat 8 | 6.75 lbs. | 20 lbs. | 26" | 18" |
| Infant Car Seat | 7.8 lbs. | 35 lbs. | 35" | 21.75" |

TABLE 2

| Seat Name/ Seat Features | Car Envelope | Legroom | Base Footprint on Vehicle Seat |
| --- | --- | --- | --- |
| Seat 1 | 24.5" | 1" | 19.5" |
| Seat 2 | 26.5" | 0" | 23" |

TABLE 2-continued

| Seat Name/ Seat Features | Car Envelope | Legroom | Base Footprint on Vehicle Seat |
| --- | --- | --- | --- |
| Seat 3 | 28.5" | 1.5" | 21" |
| Seat 4 | 26.5" | 1.5" | 18" |
| Seat 5 | 24" | 0" | 21" |
| Seat 6 | 24" | 0" | 17.5" |
| Seat 7 | 27"-28" | 0" | 16.5" |
| Seat 8 | 26.5" | 2" | 19" |
| Infant Car Seat | 27.75" | 1.75-2.875" | 19.5" |

The carrier weight in Table 1 refers to the weight of the carrier in pounds. The carrier weight of an infant car seat in accordance with the invention can be less than 10 pounds, for example, about 7.8 pounds, such as 7.8 pounds. In another exemplary embodiment, the carrier weight can be about 6.75 pounds, such as 6.75 pounds.

The rated weight refers to the maximum weight of a child who can safely occupy the infant car seat and is assigned by a manufacturer in accordance with the guidance provided by National Highway Traffic Safety Administration (NHTSA) Regulation FMVSS 571.213. The manufacturer assigns a rated weight based on testing the infant car seat with various standardized crash dummies (for example, a newborn test dummy conforming to part 572, subpart K; a 9-month old test dummy conforming to part 572 subpart J; or a 3-year-old test dummy conforming to part 572, subpart C). The infant car seat in accordance with the invention can have a rated weight of up to 40 pounds, or, alternatively, a rated weight of up to 35 pounds, such as 35 pounds. For example, the infant car seat can have a rated weight of greater than about 22 pounds (such as greater than 22 pounds), or a rated weight of at least about 27.5 pounds (such as 27.5 pounds), or a rated weight of greater than about 28.6 pounds (such as greater than 28.6 pounds).

The rated height refers to the maximum height of a child who can safely occupy the infant car seat and is assigned by a manufacturer in accordance with the guidance provided by National Highway Traffic Safety Administration (NHTSA) Regulation FMVSS 571.213. The manufacturer assigns a rated height based on testing the infant car seat with various standardized crash dummies (for example, a newborn test dummy conforming to part 572, subpart K; a 9-month old test dummy conforming to part 572 subpart J; or a 3-year-old test dummy conforming to part 572, subpart C). The infant car seat in accordance with the invention can have a rated height of up to 35 inches, such as 35 inches.

The seat back length is a fit to child metric. The seat back length pertains to the seated height of the child from the child's bottom to the top edge of the seat shell 200. The seat back length refers to the distance along a front surface 206 of the seat back 210 of the carrier 200, measured from the seat bight SB to an uppermost point of the seat back 210, along a longitudinal axis bisecting the carrier 200, as shown in FIG. 9. An infant car seat in accordance with the invention can have a seat back length of greater than about 20 inches (such as greater than 20 inches), for example, a length of about 21.5 inches (such as 21.5 inches) or a length of about 21.75 inches (such as 21.75 inches).

Figure 10:
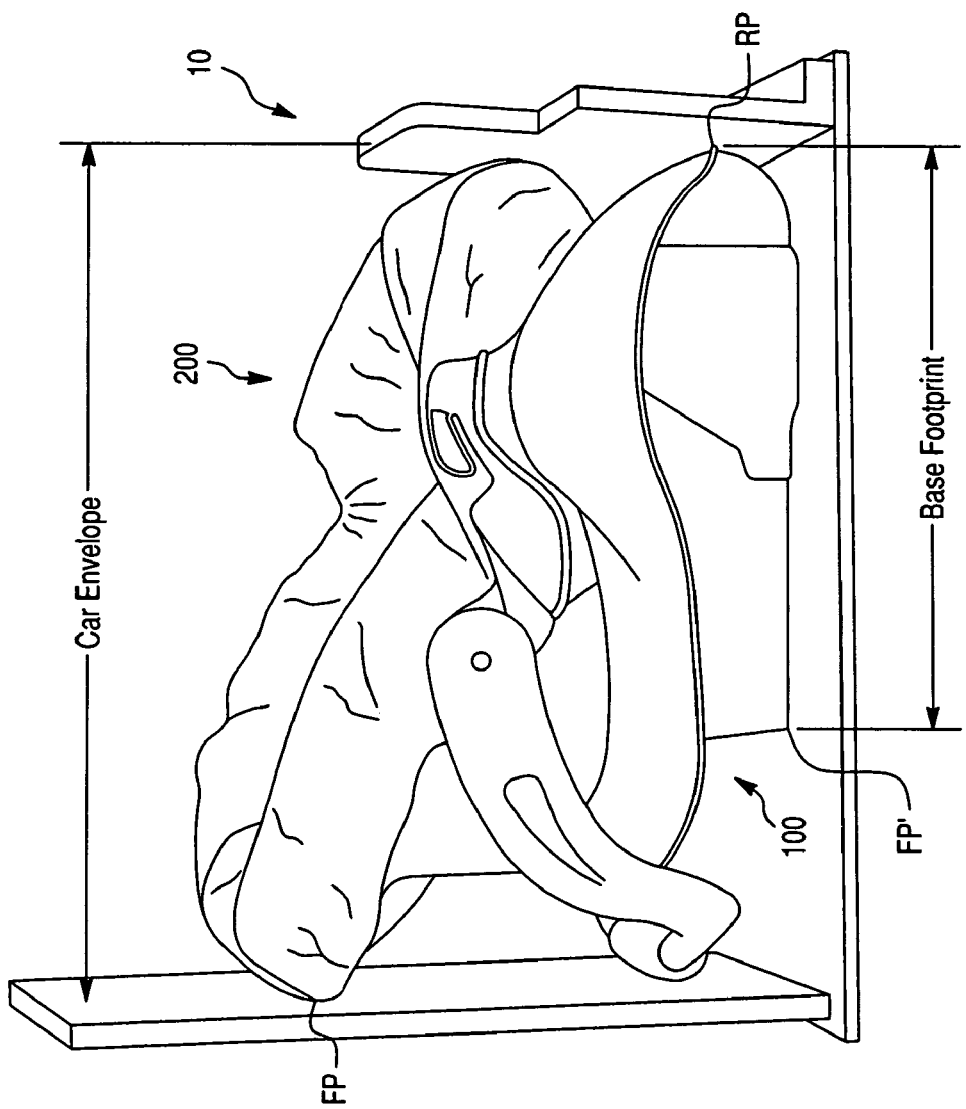
FIG. 10 is a side view of the infant car seat that illustrates the car envelope measurement and the base footprint measurement of the infant car seat.

The car envelope is a fit to vehicle metric. The car envelope signifies the space occupied by the infant car seat 10 when installed in the rear seat of a vehicle. The car envelope is measured from the foremost point FP of the infant car seat 10 to the rearmost point RP of the infant car seat 10, as shown in FIG. 10. In the illustrated embodiment, the foremost point FP is at the foremost point of the carrier 200, and the rearmost point is at the rearmost point of the base 100. An infant car seat in accordance with the invention can have a car envelope of about 27.75 inches (such as 27.75 inches) or, alternatively, a car envelope of about 28 inches (such as 28 inches).

Legroom is a fit to child metric. The legroom measurement indicates the space available for the child's lower leg and feet. Legroom is measured along a horizontal plane from the upper rear edge 211 of the carrier 200 to a seat back 1000 of the vehicle seat, as shown in FIG. 11. An infant car seat in accordance with the invention, in which the carrier can move between a first, reclined position and a second, upright position relative to the base, can provide up to 3.5 inches of legroom for the infant, or, in another embodiment, up to 2.875 inches of legroom for the infant. For example, in one embodiment, the available legroom ranges from about 1.0 inches (such as 1.0 inch) of available legroom in the first, reclined position to up to about 3.5 inches (such as 3.5 inches) of available legroom in the second position. In another embodiment, the available legroom ranges from about 1.75 inches (such as 1.75 inches) of available legroom in the first, reclined position to up to about 2.875 inches (such as 2.875 inches) of available legroom in the second position. The available legroom of the infant car seat 10 thus can be greater than 2 inches in the second position.

The base footprint is a fit to vehicle metric. The base footprint represents the length of the bottom surface of the base 100 that contacts the vehicle seat. The base footprint is measured from the foremost point FP' of the base that is in contact with the vehicle seat to the rearmost point RP of the infant car seat 10, as shown in FIG. 10. An infant car seat in accordance with the invention can have a base footprint of about 19.5 inches, such as 19.5 inches.

Each of the above-described characteristics of the infant car seat, i.e., carrier weight, rated weight, rated height, seat back length, car envelope, legroom, and base footprint, can vary independently, and the infant car seat of the invention includes infant car seats in which one or more of the above-described characteristics fall within the disclosed ranges.

As compared to commercially available car seats for infants, such as Seats 1-8 in Tables 1 and 2, the infant car seat 10 provides a superior fit to child and a superior fit to vehicle, while also offering the convenience of a carrier. As for fit to child, the infant car seat 10 can fit comfortably a child weighing up to 35 pounds and standing up to 35 inches tall and provides up to 3.5 inches of legroom, for example. As for fit to vehicle, the infant car seat 10 can measure 28 inches from front to back, for example, and, consequently, fits well in most popular automotive vehicles. As for carrying convenience, the carrier weight of the infant car seat 10 can be 7.8 pounds or, alternatively, 6.75 pounds, for example, both of which are smaller than most infant car seat carriers with rated weights only up to 22 pounds. The infant car seat 10 also features an ergonomic handle 900 that offers carrying comfort and flexibility to parents.

Fit to child, fit to vehicle, and carrying convenience now will be discussed.

The infant car seat 10 provides a comfortable fit to a 1-year old infant. The infant car seat 10 of FIGS. 1-5 has been crash tested with a 3-year old National Highway Transportation Safety Administration (NHTSA) approved dummy that weighs 35 pounds and measures 38.5 inches in height. Per data released by the Centers for Disease Control and Prevention (CDC), a 95$^{th}$ percentile 1-year old will weigh 27.5 pounds and will measure 31.75 inches in length. The infant car seat 10 can accommodate a child of a weight up to 35 pounds and a height up to 35 inches, for example. Proper fit to a child is made possible by the two-position base/carrier arrangement that allows the carrier 200 to rotate between two positions relative to the base 100, as described in detail above. By rotating 10 degrees within the base 100 from Position 1 to Position 2, as shown in FIG. 5, the carrier 200 can create a total legroom of up to 3.5 inches. This additional legroom occurs without increase in the space occupied by the infant car seat 10 in the vehicle, and it offers enough legroom and space for a 95$^{th}$ percentile 1-year old male child. A seat back length of about 21.5 inches also contributes to the superior fit to child.

The infant car seat 10 also allows for a compact fit inside the vehicle. Convertible car seats can take up to 31 inches inside the vehicle when placed in rear-facing mode. This space requirement can cause discomfort to driver and/or the front passenger, as their vehicle seats need to be moved closer to front of vehicle to provide space for the convertible car seat. The car envelope measurement of the infant car seat 10 can be about 28 inches, for example, and does not change between the first and second positions of the carrier 200. Also, the base footprint of the infant car seat 10 can measure only about 19.5 inches, which is very comparable to conventional car seats. Hence, without compromising on car fit, that is, without requiring additional in-vehicle space, the infant car seat 10 provides a comfortable fit to a child, to a driver, and to a front passenger.

Carrying convenience is an important consideration in selecting an infant car seat. The weight of the carrier added to the weight of a growing infant makes carrying tedious. Carrying fatigue is a major cause of frustration to parents. The infant car seat 10 is lightweight, which is facilitated by shifting heavier parts necessary for function from the carrier to the base and by optimizing material use in the carrier. Carrying convenience also is a factor of human ergonomics. The handle of the infant car seat 10 is ergonomically designed to offer the best carrying comfort and to reduce the effects of carrying fatigue normally associated with extended carrying times. Overmolding in the grip area can be provided for additional comfort. The handle shape and cradle carry positions offer flexibility and choice to parents. Further, grips can be provided on the carrier shell, such as grips 502, 504 described in copending U.S. application No. 10/999,147, entitled INFANT CAR SEAT, filed Nov. 30, 2004, which is incorporated by reference in its entirety, for carrying flexibility.

It will be understood that the infant car seat 10 can be used in a variety of vehicles, including but not limited to cars, trucks, buses, and airplanes.

The preferred embodiments have been set forth herein for the purpose of illustration. This description, however, should not be deemed to be a limitation on the scope of the invention. Various modifications, adaptations, and alternatives may occur to one skilled in the art without departing from the claimed inventive concept. The true scope and spirit of the invention are indicated by the following claims.

What is claimed is:

1. An infant car seat, comprising:
    a base;
    a plurality of latch components carried on the base including a lever link, one or more latch hooks biased to a latching position and coupled with the lever link, and a release link coupled at one end to the latch hooks and at the other end to the lever link;
    a carrier to detachably secure to the base; and
    latch components carried on the carrier including a handle connected to a hook movable via the handle and one or more carrier pins, the hook coupled with the lever link, wherein the handle on the carrier can move to cause the hook on the carrier to selectively engage or disengage the base and to cause the lever link to move the release link and in turn move the latch hooks on the base to selectively engage and disengage the carrier pins, and wherein the carrier has a carrier weight of less than 10 pounds, and the infant car seat has a rated weight of up to 40 pounds.

2. The infant car seat according to claim 1, wherein the carrier is positionable on the base in a first position and in a second position.

3. The infant car seat according to claim 1, wherein the carrier weight is 6.75 pounds.

4. The infant car seat according to claim 1, wherein the carrier weight is about 7.8 pounds.

5. The infant car seat according to claim 1, wherein the rated weight is greater than 22 pounds.

6. The infant car seat according to claim 1, wherein the rated weight is at least about 27.5 pounds.

7. The infant car seat according to claim 1, wherein the rated weights is greater than about 28.6 pounds.

8. The infant car seat according to claim 1, wherein the rated weights is 35 pounds.

9. The infant car seat according to claim 1, wherein the rated weight is up to 35 pounds.

10. The infant car seat according to claim 1, wherein the carrier has a rated height of up to 35 inches.

11. The infant car seat according to claim 1, wherein the carrier includes a seat back, and wherein a front surface of the seat back has a length of greater than about 20 inches.

12. The infant car seat according to claim 1, wherein the carrier includes a seat back, and wherein a front surface of the seat back has a length of 21.5 inches.

13. The infant car seat according to claim 1, wherein the carrier includes a seat back, and wherein a front surface of the seat back has a length of about 21.75 inches.

14. An infant car seat, comprising:
a base;
a plurality of latch components carried on the base including a lever link, one or more latch hooks biased to a latching position and coupled with the lever link, and a release link coupled at one end to the latch hooks and at the other end to the lever link;
a carrier to detachably secure to the base, the carrier including a seat back; and
latch components carried on the carrier including only a movable handle connected to a part movable via the handle and one or more carrier pins, the part in contact with the lever link,
wherein the handle on the carrier is movable to actuate the part on the carrier to selectively engage or disengage the base and to actuate the lever link to move the release link and in turn move the latch hooks on the base to selectively engage or disengage the carrier pins to respectively secure or detach the carrier to the base, and wherein the carrier has a carrier weight of less than 10 pounds, a front surface of the seat back of the carrier has a length greater than about 20 inches, and the infant car seat has a rated weight of at least about 27.5 pounds.

15. The infant car seat according to claim 14, wherein carrier is positionable on the base in a first position and in a second position.

16. The infant car seat according to claim 14, wherein the rated weight is up to 40 pounds.

17. The infant car seat according to claim 14, wherein the front surface of the seat back has a length of 21.5 inches, and the rated weight is up to 35 pounds.

18. The infant car seat according to claim 17, wherein the rated weight is 35 pounds.

19. The infant car seat according to claim 17, wherein the rated weight is greater than about 29 pounds.

20. The infant car seat according to claim 14, wherein the front surface of the seat back has a length of about 21.75 inches.

21. The infant car seat according to claim 14, wherein the carrier weight is about 7.8 pounds.

22. An infant car seat, comprising:
a base;
a plurality of latch components carried on the base including a lever link, one or more latch hooks biased to a latching position and coupled with the lever link, and a release link coupled at one end to the hitch hooks and at the other end to the lever link;
a carrier to detachably secure to the base, the carrier including a seat back; and
latch components carried on the carrier including only a handle connected to a hook movable via the handle and one or more carrier pins, the hook coupled with the lever link and biased to a latching position,
wherein the handle on the carrier is movable to actuate the hook on the carrier to move relative to the base and the one or more latch hooks to move relative to the one or more carrier pins between the respective latching positions to secure the carrier to the base and a release position to release the carrier from the base, and wherein the carrier has a carrier weight of less than 10 pounds, a front surface of the seat back of the carrier has a length greater than about 20 inches, and the infant car seat has a rated weight of greater than 22 pounds.

23. The infant car seat according to claim 22, wherein the carrier is positionable on the base in a first position and in a second position.

24. The infant ear seat according to claim 22, wherein the carrier weight is 6.75 pounds.

25. The infant car seat according to claim 22, wherein the carrier weight is about 7.8 pounds.

26. The infant car seat according to claim 22, wherein the front surface of the seat back has a length of 21.5 inches.

27. The infant ear seat according to claim 22, wherein the front surface of the seat back has a length of about 21.75 inches.

28. The infant car seat according to claim 22, wherein the rated weight is up to 35 pounds.

29. The infant car seat according to claim 22, wherein the rated weight is up to 40 pounds.

30. The infant car seat according to claim 22, wherein the rated weight is 35 pounds.

31. An infant car seat, comprising:
a base;
a plurality of latch components carried on the base including a lever link, a pair of latch hooks biased to a latching position and coupled with the lever link, and a release link coupled at one end to the pair of latch hooks and at the other end to the lever link;
a carrier to detachably secure to the base; and
latch components carried on the carrier including only a handle connected to a movable part and a pair of carrier pins, the movable part also coupled with the lever link and engaging the base in a latching position,
wherein the handle on the carrier drives movement of the movable part to move relative to the base and to move the lever link and the release link on the base such that the movable part engages the base and the latch hooks engage the carrier pins in the respective latching positions to secure the carrier to the base and disengage the movable part and the latch hooks in a detachable position to release the carrier from the base, and wherein the carrier has a carrier weight of less than 10 pounds, and the infant car seat has a rated height of up to 35 inches.

32. An infant car seat, comprising:

a base;

a plurality of latch components carried on the base including a lever link, a pair of latch hooks movably biased to a latching position and coupled with the lever link, and a release link coupled at one end with the latch hooks and at the other end with the lever link;

a carrier to detachably secure to the base, the carrier having an upper rear edge, the carrier being positionable on the base in a first latching position and in a second latching position; and latch components carried on the carrier including only a handle connected to a movable part and a pair of carrier pins, the movable part coupled with the lever link, wherein, when the carrier is secured to the base, the carrier provides legroom measured along a horizontal plane from the upper rear edge of the carrier to a seat back of the vehicle seat, and wherein the handle on the carrier is movable to actuate the hook on the carrier and the latch hooks on the base to secure the carrier to the base or to release the carrier from the base, and wherein the carrier has a carrier weight of less than 10 pounds and provides legroom of greater than 2 inches in the second latching position.

33. The infant car seat according to claim 32, wherein the carrier weight is 6.75 pounds.

34. The infant car seat according to claim 32, wherein the carrier weight is about 7.8 pounds.

35. The infant car seat according to claim 32, wherein the crier provides legroom of up to 3.5 inches.

36. The infant car seat according to claim 32, wherein the carrier provides legroom of up to 2.875 inches.

\* \* \* \* \*